(12) United States Patent
Yamaguchi et al.

(10) Patent No.: US 7,692,412 B2
(45) Date of Patent: Apr. 6, 2010

(54) CHARGING CONTROL APPARATUS, CHARGING CONTROL METHOD

(75) Inventors: Kazuhi Yamaguchi, Hyogo (JP); Kouji Fukuoka, Hyogo (JP); Shinji Yamashita, Hyogo (JP); Shinji Takemoto, Hyogo (JP); Shinichiro Takatomi, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 415 days.

(21) Appl. No.: 11/706,369

(22) Filed: Feb. 15, 2007

(65) Prior Publication Data

US 2007/0194761 A1 Aug. 23, 2007

(30) Foreign Application Priority Data

Feb. 20, 2006 (JP) ............................. 2006-042578
Feb. 20, 2006 (JP) ............................. 2006-042579

(51) Int. Cl.
*H02P 11/00* (2006.01)
*H02P 9/00* (2006.01)

(52) U.S. Cl. ...................................... 322/44

(58) Field of Classification Search ................ 322/28, 322/24, 44, 59; 307/10.1; 323/201
See application file for complete search history.

(56) References Cited

U.S. PATENT DOCUMENTS

| 4,689,545 | A | * | 8/1987 | Komurasaki et al. .......... 322/14 |
| 5,231,344 | A | | 7/1993 | Marumoto et al. |
| 5,512,812 | A | * | 4/1996 | Ono ............................. 322/28 |
| 5,608,309 | A | | 3/1997 | Hikita et al. |
| 5,886,504 | A | * | 3/1999 | Scott et al. ..................... 322/15 |
| 2007/0194761 | A1 | * | 8/2007 | Yamaguchi et al. ........... 322/28 |

FOREIGN PATENT DOCUMENTS

| FR | 2 766 991 | | 2/1999 |
| JP | A-61-203834 | | 9/1986 |
| JP | A-4-145843 | | 5/1992 |
| JP | A-04-347536 | | 12/1992 |
| JP | A-5-103433 | | 4/1993 |
| JP | A-6-90533 | | 3/1994 |
| JP | 07147737 A | * | 6/1995 |
| JP | A-08-336237 | | 12/1996 |
| JP | B2 3010719 | | 12/1999 |

(Continued)

*Primary Examiner*—Julio C. Gonzalez
(74) *Attorney, Agent, or Firm*—Oliff & Berridge, PLC

(57) ABSTRACT

A charging control apparatus is adapted to control an alternator which is operable to generate a voltage to charge a battery which is operable to supply the voltage to an electric component. An interface is connected to the alternator, the battery, and the electric component and operable to input and output a signal therebetween. A microcomputer is connected to the interface and operable to execute a gradual change process in which a generating voltage of the alternator is gradually changed to a target generating voltage of the alternator and a sudden change process in which the generating voltage is suddenly changed to the target generating voltage. The microcomputer is operable to detect a using status of the electric component based on the signal. The microcomputer is operable to judge whether the gradual change process is required or the sudden change process is required based on the detected using status. The microcomputer executes the sudden change process when the microcomputer judges that the sudden change process is required. The microcomputer executes the gradual change process when the microcomputer judges that the gradual change process is required.

4 Claims, 25 Drawing Sheets

FOREIGN PATENT DOCUMENTS

| | | |
|---|---|---|
| JP | B2 3044867 | 3/2000 |
| JP | 2002-369403 | 12/2002 |
| JP | A-2003-075518 | 3/2003 |
| JP | A-2005-335498 | 12/2005 |
| JP | A-2006-049198 | 2/2006 |
| JP | A-2006-050846 | 2/2006 |

* cited by examiner

FIG. 14

| VEHICLE RUNNING CONDITION BEFORE BEING CHANGED | VEHICLE RUNNING CONDITION AFTER BEING CHANGED | GRADUAL CHANGE RATE | |
|---|---|---|---|
| | | POWER BEING CUT | POWER NOT BEING CUT |
| DECELERATION | IDLE | 0.05V/100ms | 0.05V/100ms |
| | CONSTANT RATE | 0.05V/100ms | 0.05V/100ms |
| | ACCELERATION | 0.1V/100ms | 0.05V/100ms |
| ACCELERATION | DECELERATION | 0.05V/100ms | 0.1V/100ms |
| | CONSTANT RATE | 0.05V/100ms | 0.05V/100ms |
| CONSTANT RATE | ACCELERATION | 0.1V/100ms | 0.05V/100ms |
| | DECELERATION | 0.05V/100ms | 0.1V/100ms |
| IDLE | ACCELERATION | 0.1V/100ms | 0.05V/100ms |

| VEHICLE RUNNING CONDITION BEFORE BEING CHANGED | VEHICLE RUNNING CONDITION AFTER BEING CHANGED | GRADUAL CHANGE RATE |
|---|---|---|
| DECELERATION | IDLE | 0.1V/100ms |
| | CONSTANT RATE | 0.1V/100ms |
| | ACCELERATION | 0.1V/100ms |
| ACCELERATION | DECELERATION | 0.2V/100ms |
| | CONSTANT RATE | 0.1V/100ms |
| CONSTANT RATE | ACCELERATION | 0.1V/100ms |
| | DECELERATION | 0.2V/100ms |
| IDLE | ACCELERATION | 0.1V/100ms |

161 CHARGING RATE-CORRECTION VALUE GRAPH

162 LIQUID TEMPERATURE-CORRECTION VALUE GRAPH

FIG. 30

164 CHARGING RATE-CORRECTION TABLE

| BATTERY CHARGING RATE [%] | 75 | 70 | 65 | 60 | 55 | ...... |
|---|---|---|---|---|---|---|
| CORRECTION VALUE [V] | 0.1 | 0.1 | 0.2 | 0.2 | 0.3 | ...... |

FIG. 31

165 VEHICLE SITUATION-CORRECTION TABLE

| VEHICLE SITUATION | ACCELERATION | IDLE | CONSTANT RATE | DECELERATION OR RACING |
|---|---|---|---|---|
| CORRECTION VALUE [V] | X1 | X2 | X3 | X4 |

CHARGING CONTROL APPARATUS, CHARGING CONTROL METHOD

The disclosure of Japanese Patent Application No. 2006-042578 and No. 2006-042579 both filed Feb. 20, 2006 including specifications, drawings and claims are incorporated herein by reference in its entireties.

BACKGROUND

The present invention relates to a charging control apparatus and a charging control method.

A battery for supplying power to electric components and an alternator for generating the power to charge the battery while an engine is operated are mounted on an engine-driven vehicle.

In a related-art charging control, as one of methods for rapidly charging the battery, an alternator adjustment voltage to adjust a voltage generated by the alternator is set to relatively high voltage when the vehicle is decelerated since the alternator can generate much power by regeneration thereof, thereby increasing the power generated by the alternator. In addition, the alternator adjustment voltage is set to relatively low voltage when the vehicle is accelerated since engine torque required for accelerating the vehicle is prioritized, thereby decreasing the power generated by the alternator.

While such a charging control, if the alternator adjustment voltage is suddenly changed from a high value to a low value and vice versa, a voltage of the battery connected to the alternator is also suddenly changed. The suddenly changing of the voltage of the battery may effect operation of the electric component mounted on the vehicle. For example, a light mounted on the vehicle suddenly flickers.

In order to prevent the voltage of the battery from being suddenly changed, in the related-art charging control, the alternator adjustment voltage is gradually changed to a target alternator adjustment voltage (see Japanese Patent No. 3044867, paragraphs [0017] to [0022]).

However, in the related-art charging control, for example, even in a case where the light is not used, the alternator adjustment voltage is gradually changed when the vehicle is decelerated or accelerated, so that charging efficiency of the battery is decreased.

On the other hand, with sudden spread of vehicles, needs for improving comportability, safety, and convenience of vehicles are increased. To satisfy the needs, the number of the electric components such as an air conditioner and a navigator which are installed in the vehicle is increased, thereby increasing electrical load of the battery. Therefore, it is necessary to control for charging the battery in order to prevent the battery from voltage reduction and deterioration.

However, in some cases, the charging efficiency of the battery is deteriorated according to condition of the battery. In order to overcome such a problem, in a related-art battery charging apparatus, the charging efficiency of the battery is determined from an open voltage of the battery and a regulator adjustment voltage to indirectly control a voltage output from the alternator is corrected based on the determined efficiency of the battery (see Japanese Patent No. 3010719). Namely, the related-art battery charging apparatus prevents the battery from an overcharging by correcting the regulator adjustment voltage according to the charging efficiency of the battery, thereby increasing the lifetime of the battery.

However, although the related-art battery charging apparatus controls the alternator to charge the battery according to the charging efficiency of the battery in order to improve the lifetime of the battery, it does not control the alternator in order to rapidly charge the battery.

SUMMARY

It is therefore an object of the invention to provide a charging control apparatus and a charging control method, which are capable of charging a battery with high efficiency.

It is also an object of the invention to provide a charging control apparatus which is capable of rapidly charging a battery by correcting a target electric quantity to be output from an electric generator such as an alternator based on a condition of a vehicle.

In order to achieve the above described objects, according to the invention, there is provided a charging control apparatus adapted to control an alternator which is operable to generate a voltage to charge a battery which is operable to supply the voltage to an electric component, the charging control apparatus comprising:

an interface, connected to the alternator, the battery, and the electric component and operable to input and output a signal therebetween; and a microcomputer, connected to the inter face and operable to execute a gradual change process in which a generating voltage of the alternator is gradually changed to a target generating voltage of the alternator and a sudden change process in which the generating voltage is suddenly changed to the target generating voltage, wherein:

the microcomputer is operable to detect a using status of the electric component based on the signal;

the microcomputer is operable to judge whether the gradual change process is required or the sudden change process is required based on the detected using status;

the microcomputer executes the sudden change process when the microcomputer judges that the sudden change process is required; and the microcomputer executes the gradual change process when the microcomputer judges that the gradual change process is required.

According to the invention, there is also provided a charging control method for controlling an alternator which is operable to generate a power to charge a battery which is operable to supply the power to an electric component, the charging control method comprising:

detecting a using status of the electric component;

judging whether the gradual change process in which a generating voltage of the alternator is gradually changed to a target generating voltage of the alternator is required or sudden change process in which the generating voltage is suddenly changed to the target generating voltage based on the detected using status;

executing a sudden change process when the sudden change process is required; and executing the gradual change process when the gradual change process is required.

According to the charging control apparatus and the charging control method, since it is determined whether the gradual change process is required or the sudden change process is required, based on the using status of the electric component, the gradual change process can be executed only when the electric component is used.

Accordingly, when the electric component is used, since the gradual change process is performed to gradually change the generating voltage of the alternator to the target generating voltage of the alternator, the voltage of the battery is prevented from being suddenly changed. Therefore, the operation of the electric component is not effected by the changing of the voltage of the battery. In addition, when the electric component is not used, since the sudden change process is performed to suddenly change the generating voltage of the alternator to the target generating voltage of the alternator, the charging efficiency of the battery is improved, whereby the battery is rapidly charged.

According to the invention, there is also provided a charging control apparatus adapted to control an alternator which is operable to output an electric quantity to charge a battery mounted on a vehicle, the charging control apparatus comprising:

a detecting section operable to detect a condition of the vehicle;

a determining section operable to determine a target electric quantity of the alternator;

a correcting section operable to correct the target electric quantity based on the detected condition.

With this configuration, since the target electric quantity is corrected based on a correction value suitable for the conditions of the vehicle, the battery can be rapidly charged.

BRIEF DESCRIPTION OF THE DRAWINGS

The above objects and advantages of the present invention will become more apparent by describing in detail preferred exemplary embodiments thereof with reference to the accompanying drawings, wherein:

FIG. 14 is a diagram showing a first gradual change rate table according to the first embodiment;

FIG. 30 is a diagram showing a data structure of a charging rate-correction value table according to the second embodiment;

FIG. 31 is a diagram showing a data structure of a vehicle condition-correction value table according to the second embodiment.

DETAILED DESCRIPTION OF THE EMBODIMENTS

Hereinafter, a first embodiment of a charging control apparatus and a charging control method will be described in detail with reference to the accompanying drawings.

Firstly, a system configuration of a charging control system will be described.

Figure 1:
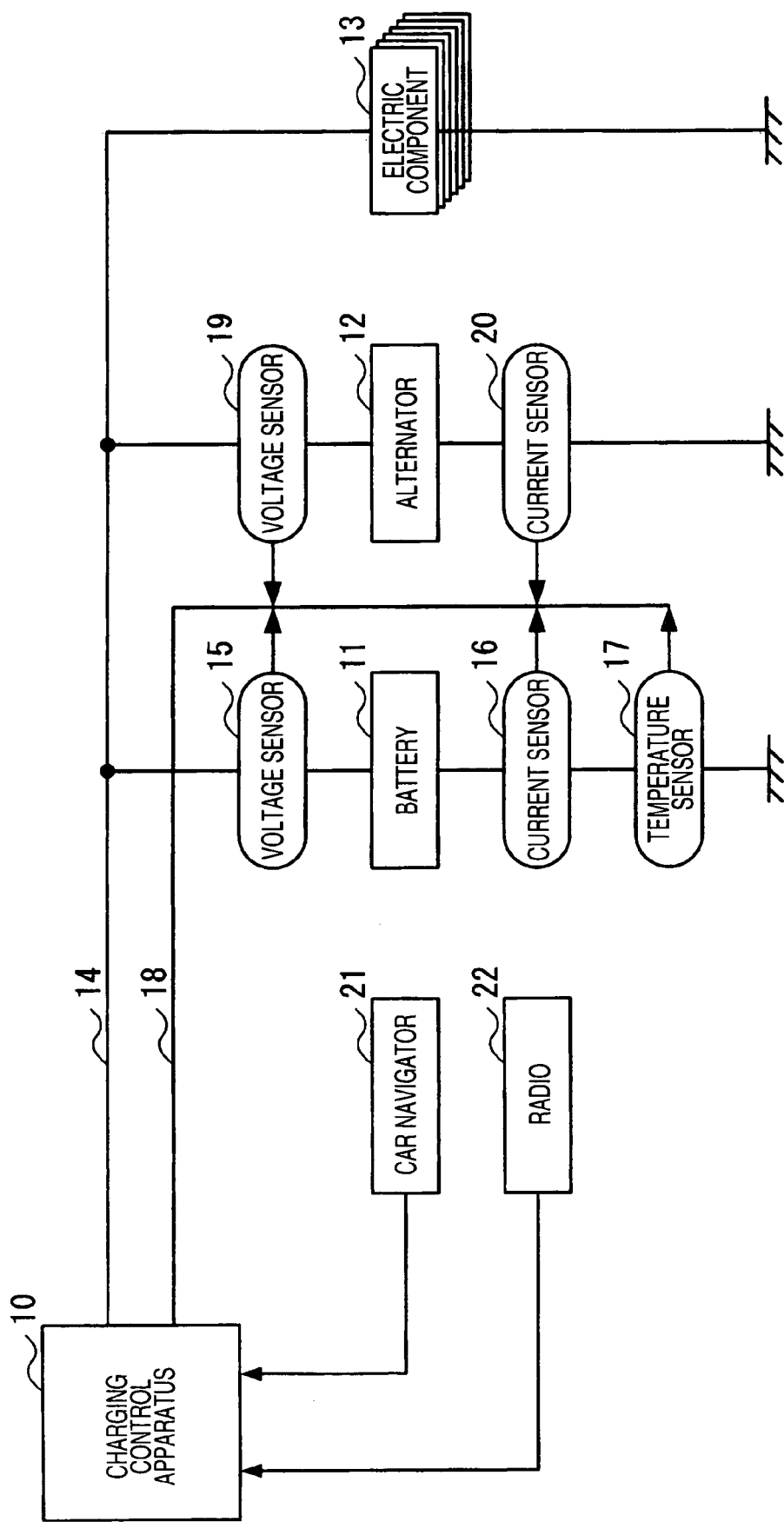
FIG. 1 is a schematic diagram showing a charging control system according to a first embodiment of the present invention.

As shown in FIG. 1, a charging control system includes a charging control apparatus 10 for controlling charging of a battery 11. An alternator 12 for generating power while an engine is operated so as to charge the battery 11, electric components 13, and the battery 11 for supplying power to the electric components 13 are connected to the charging control apparatus 10 via a power line 14.

The battery 11 is provided with a voltage sensor 15 for detecting a voltage of the battery 11, a current sensor 16 for detecting current of the battery 11, and a temperature sensor 17 for detecting liquid temperature of the battery 11. The voltage sensor 14, the current sensor 16 and the temperature sensor 17 are connected to the charging control apparatus 10 via a signal line 18. In addition, the alternator 12 is provided with a voltage sensor 19 and a current sensor 20. The voltage sensor 19 and the current sensor 20 are connected to the charging control apparatus 10 via the signal line 18.

In addition, the charging control apparatus is connected to a car navigator 21 for acquiring information on a position of the vehicle and driving path of the vehicle, and a radio 22 for acquiring weather information and so on.

For example, the electric components 13 are a light and a wiper. Namely, using status of the electric components 13 can be visually and/or auditorily recognized by a user.

Based on signals from the voltage sensor 15, current sensor 16 and temperature sensor 17 of the battery 11, signals from the voltage sensor 18 and current sensor 20 of the alternator 12, and signals from the car navigator 21 and the radio 22, the charging control apparatus determines whether it is required or not to perform a gradual change process in which a generating voltage of the alternator 12 is gradually changed to a target generating voltage of the alternator 12, and controls the charging of the battery 11 based on a result of the determination. Here, the generating voltage of the alternator 12 represents a voltage currently generated by the alternator 12. And the target generating voltage of the alternator 12 represents a voltage to be generated by the alternator 12.

Next, a hardware configuration of the charging control apparatus 10 will be described.

Figure 2:
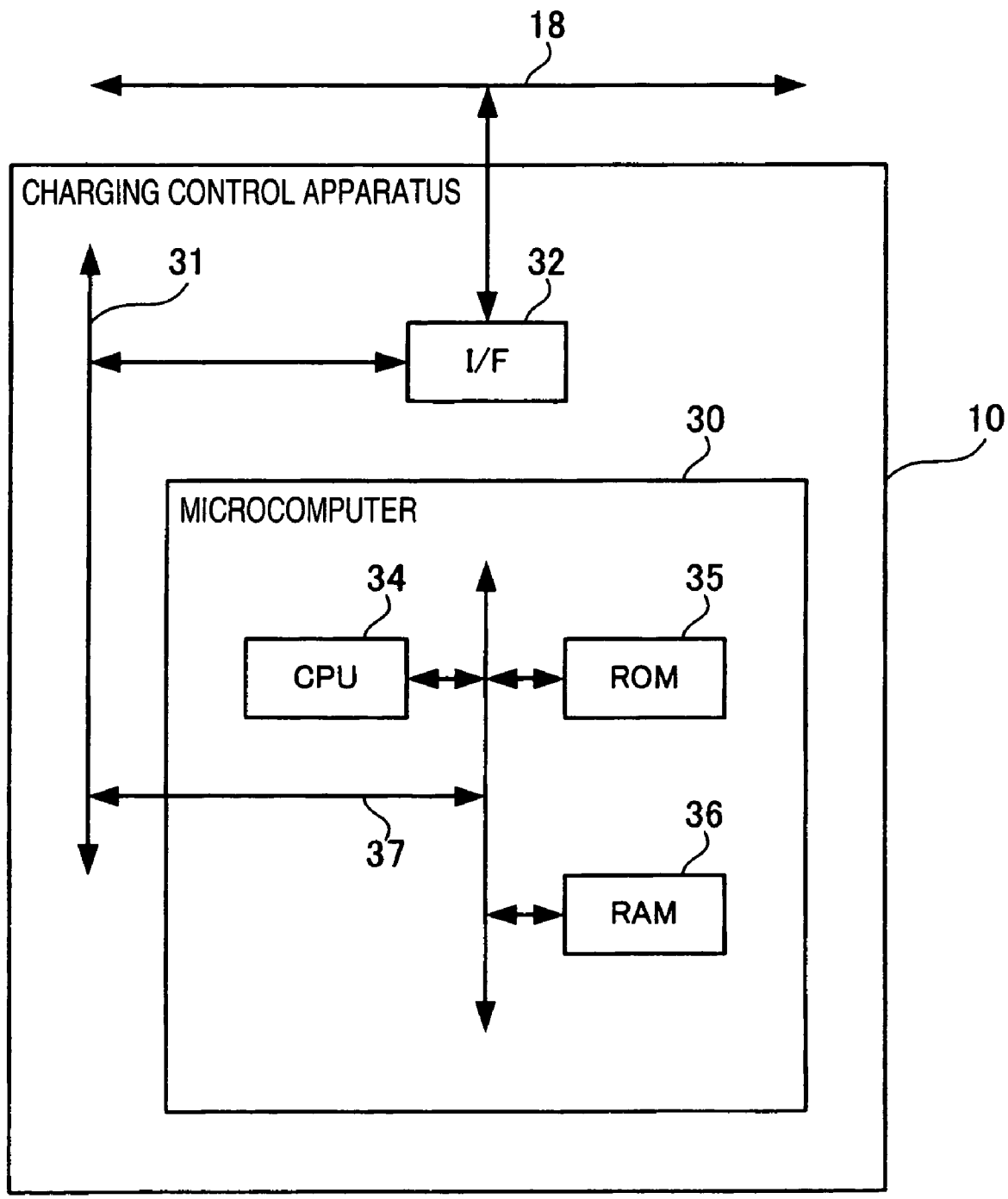
FIG. 2 is a schematic diagram showing a hardware configuration of a charging control apparatus according to the first embodiment.

As shown in FIG. 2, the charging control apparatus 10 comprises a microcomputer 30. The microcomputer 30 is connected to a bus 31 in the charging control apparatus 10 and is connected to the signal line 18 via an I/F (interface) 32.

The microcomputer 30 comprises a CPU (Central Processing Unit) 34. The CPU 34 is connected to a ROM (Read Only Memory) 35 and a RAM (Random Access Memory) 36 via a bus 37 in the microcomputer 30. In addition, the CPU 34 is connected to the bus 31 via the bus 37.

The CPU 34 controls a whole operation of the charging control apparatus 10. A program of an OS (Operating System) or at least a portion of an application program to be executed by the CPU 34 is temporarily stored in the RAM 36. In addition, various kinds of data required for processes by the CPU 34 are stored in the RAM 36. An OS and application programs are stored in the ROM 35.

The stored application programs include programs for a gradual change requirement determination process, a gradual change rate decision process, a sudden change process and a gradual change process, which are performed by the charging control apparatus 10.

Next, a functional configuration of the charging control apparatus 10 which is embodied by the hardware configuration of FIG. 2 will be described.

Figure 3:
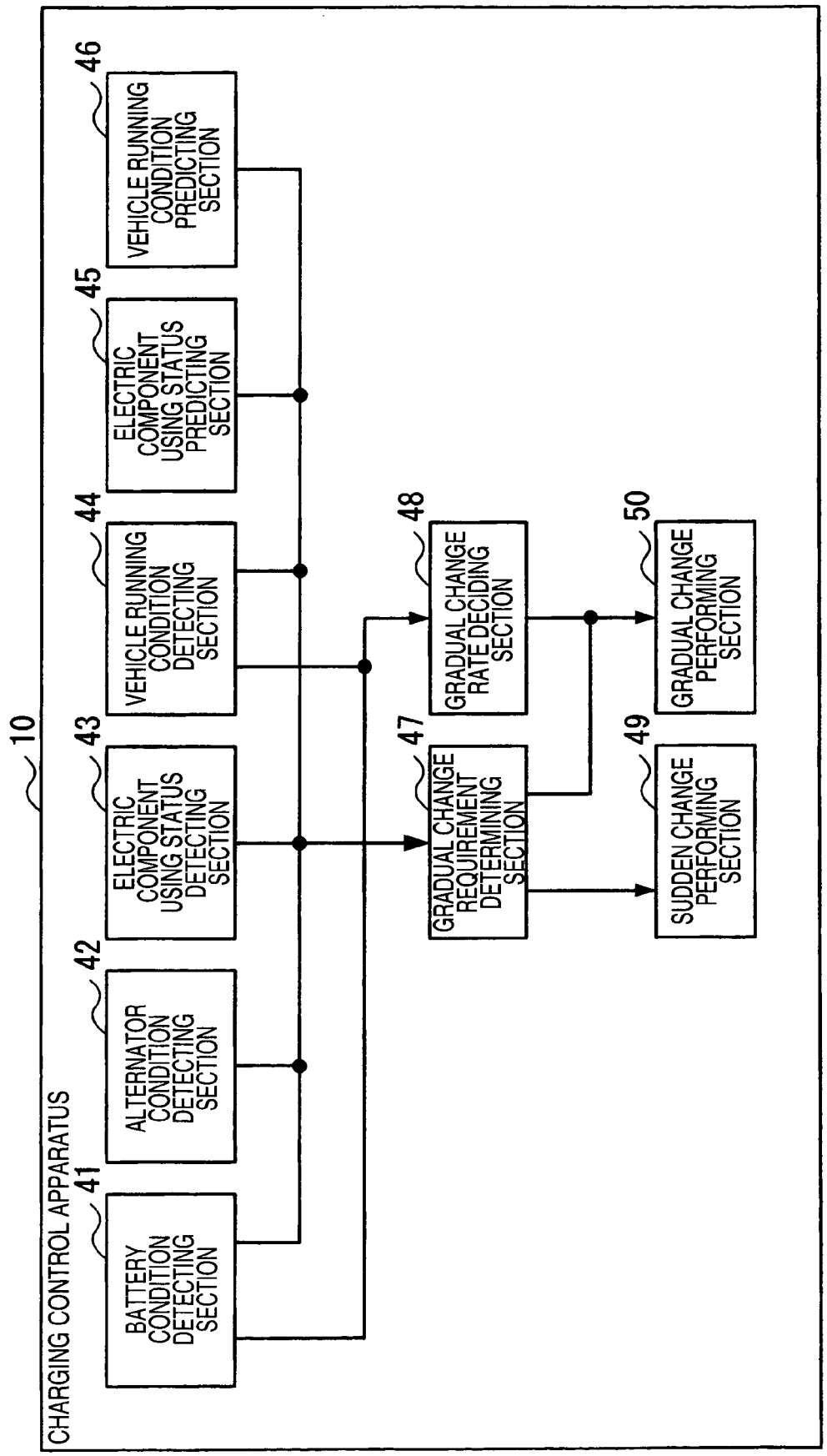
FIG. 3 is a schematic diagram showing a functional configuration of the charging control apparatus.

As shown in FIG. 3, the charging control apparatus 10 comprises a battery condition detecting section 41, an alternator condition detecting section 42, a using status detecting section 43, a vehicle running condition detecting section 44, an using status predicting section 45, a vehicle running condition predicting section 46, a gradual change requirement determining section 47, a gradual change rate deciding section 48, a sudden change performing section 49 and a gradual change performing section 50.

The battery condition detecting section 41 detects condition of the battery 11 by detecting a voltage, current and liquid temperature of the battery 11, which are detected by the voltage sensor 15, the current sensor 16 and the temperature sensor 17, respectively. In addition, the alternator condition detecting section 42 detects condition of the alternator 12 by detecting a voltage and current to be generated by the alternator 12, which are detected by the voltage sensor 19 and the current sensor 20, respectively.

The using status detecting section 43 detects using status of the electric components 13, and the using status predicting section 45 predicts the using status of the electric components 13 from external information.

The vehicle running condition detecting section 44 detects vehicle running condition related to idle, acceleration, constant speed, and deceleration, based on information from an electronic control unit that controls an engine of the vehicle, and the vehicle running condition predicting section 46 predicts the vehicle running condition from external information.

Based on results of the detection and prediction, the gradual change requirement determining section 47 determines whether it is required or not to perform the gradual change process in which the generating voltage generated by the alternator 12 is gradually changed to the target generating voltage of the alternator 12 and the gradual change rate deciding section 48 decides a gradual change rate indicating a variation width of the generating voltage of the alternator 12 per unit time when the gradual change process is performed.

When it is determined that the gradual change process is not required, or when it is determined that a sudden change process is required, the sudden change performing section 49 performs the sudden change process in which the generating voltage of the alternator 12 is suddenly changed to the target generating voltage of the alternator 12. When it is determined that the gradual change process is required, the gradual change performing section 50 performs the gradual change process based on the decided gradual change rate. Here, since the generating voltage is instantaneously changed to the target generating voltage in the sudden change process, a time period required to change the generating voltage to the target generating voltage in the sudden change process is much shorter than that in the gradual change process.

Next, the gradual change requirement determination process of the gradual change requirement determining section 47 will be described.

Figure 4:
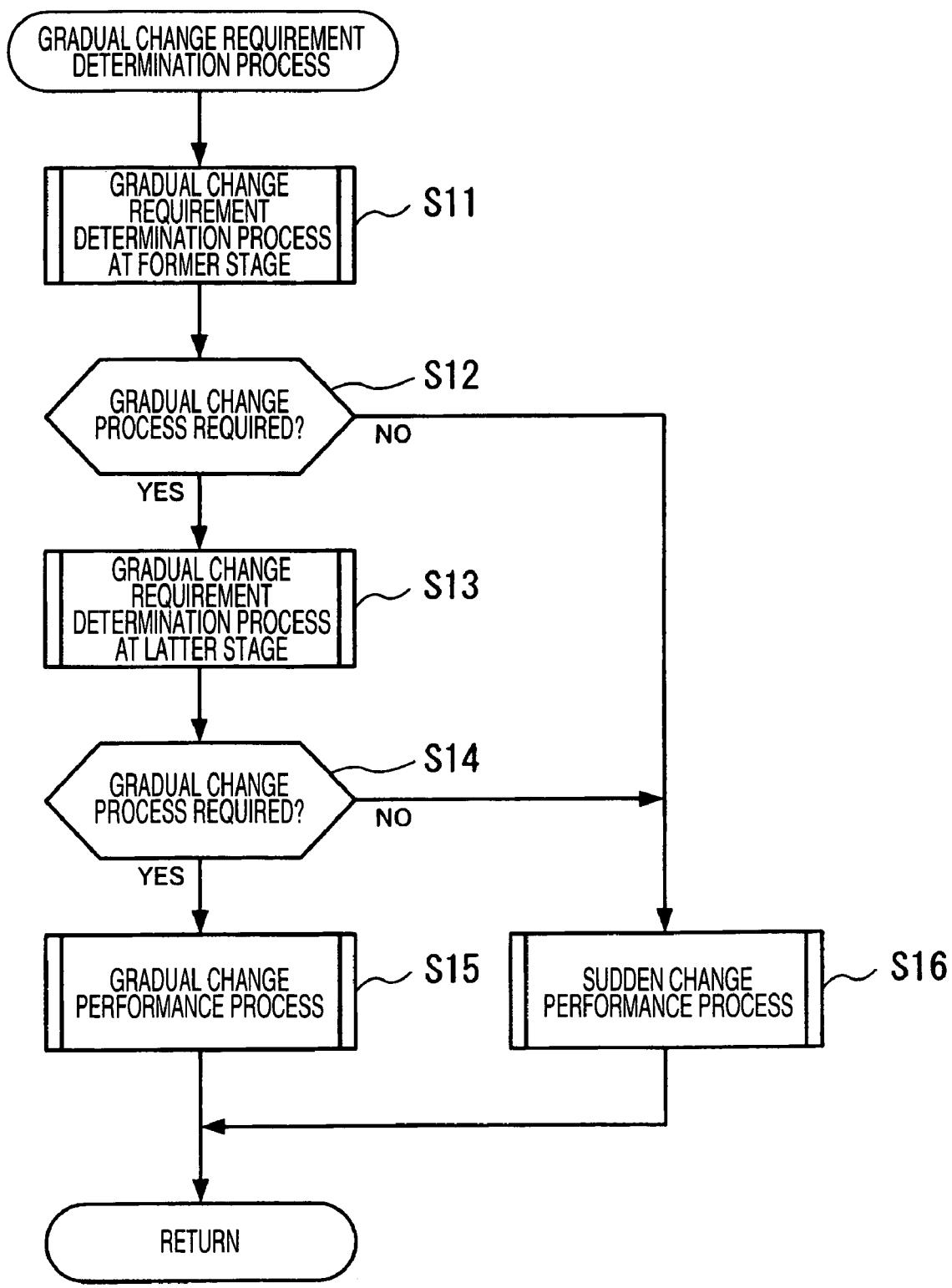
FIG. 4 is a flow chart showing a gradual change requirement determination process according to the first embodiment.

As shown in FIG. 4, the gradual change requirement determining section 47 repeatedly performs the following steps according to the program for the gradual change requirement determination process.

In the first embodiment, the gradual change requirement determination process is divided into a former stage and a latter stage.

Figure 5:
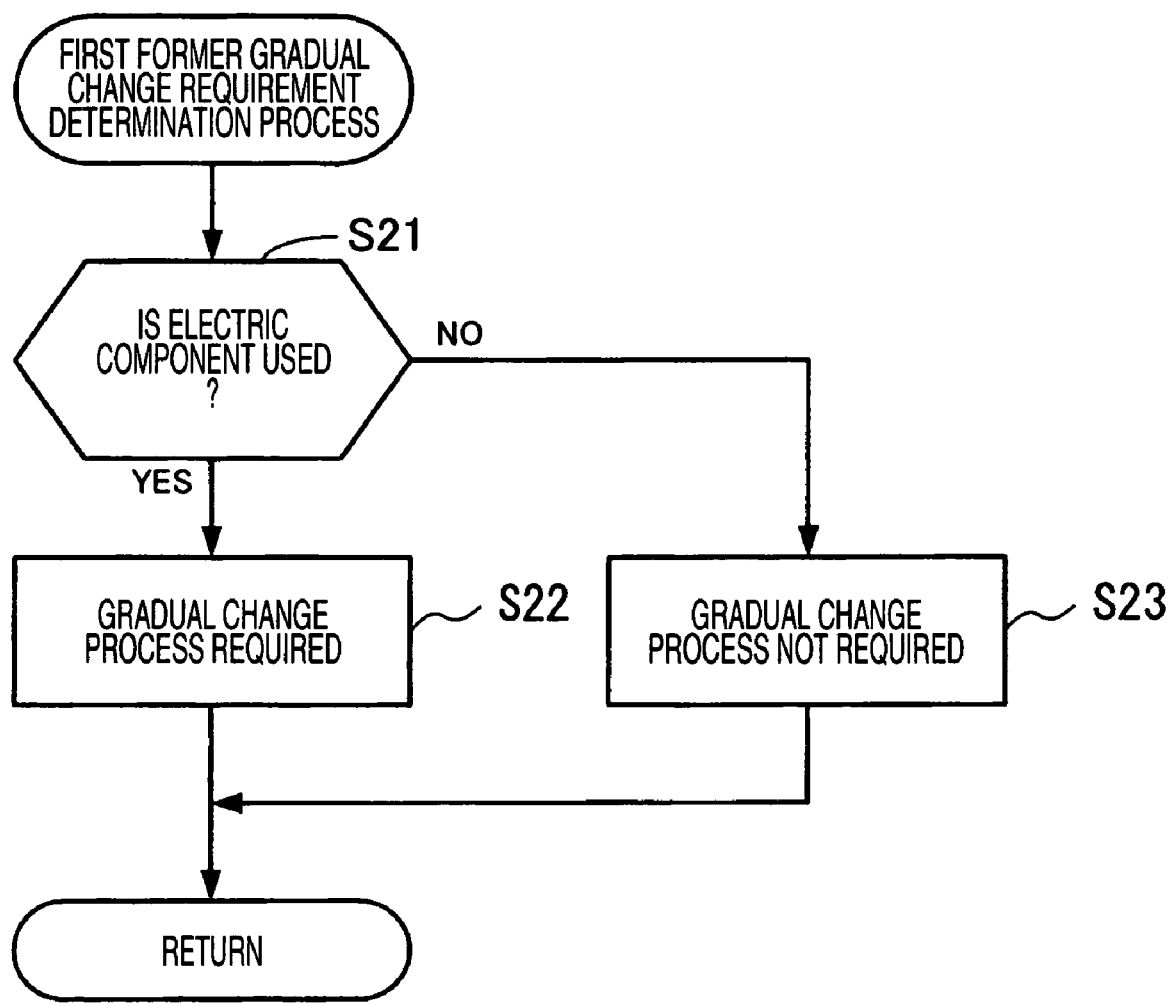
FIG. 5 is a flow chart showing a first former gradual change requirement determination process according to the first embodiment.
Figure 6:
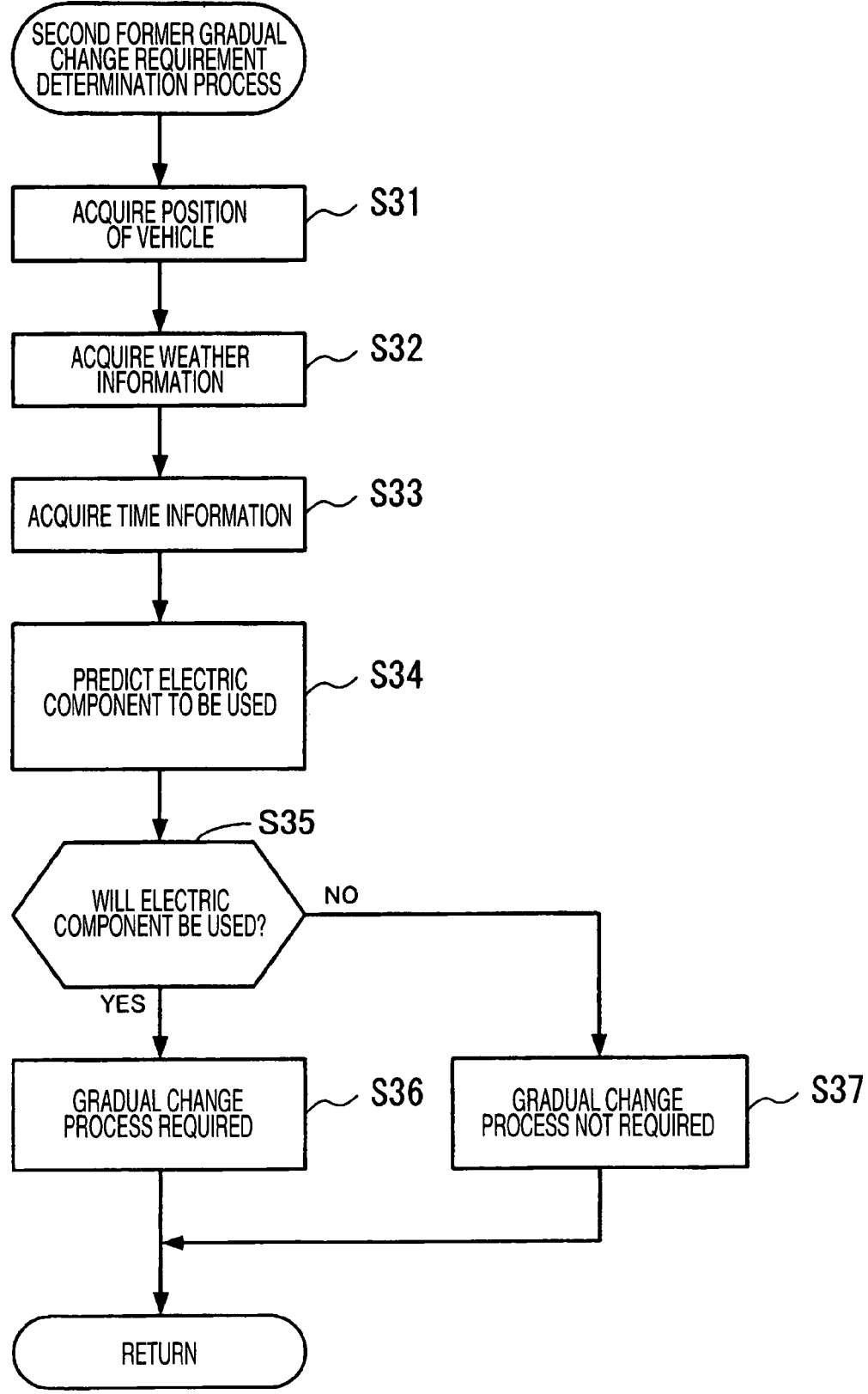
FIG. 6 is a flow chart showing a second former gradual change requirement determination process according to the first embodiment.

[Step S11] The CPU 34 performs the gradual change requirement determination process at the former stage, which is shown in FIGS. 5 and 6.

[Step S12] The CPU 34 determines whether or not the gradual change process is required, based on a result of the process at Step S11. If it is determined that the gradual change process is required, the process proceeds to Step S13. Otherwise, the process proceeds to Step S16. In Step S12, the CPU 34 may also determine whether the gradual change process is required or the sudden change process is required. In this case, if it is determined that the sudden change process is required, the process proceeds to Step S16.

[Step S13] The CPU 34 performs the gradual change requirement determination process at the latter stage, which is shown in FIGS. 7, 10, 11 and 12. This process is not indispensable but optional. When this process is performed, precision of the gradual change requirement determination process is improved.

[Step S14] The CPU 34 determines whether or not the gradual change process is required, based on a result of the process at Step S13. If it is determined that the gradual change process is required, the process proceeds to Step S15. Otherwise, the process proceeds to Step S16. In Step S14, the CPU 34 may also determine whether the gradual change process is required or the sudden change process is required. In this case, if it is determined that the sudden change process is required, the process proceeds to Step S16.

Figure 17:
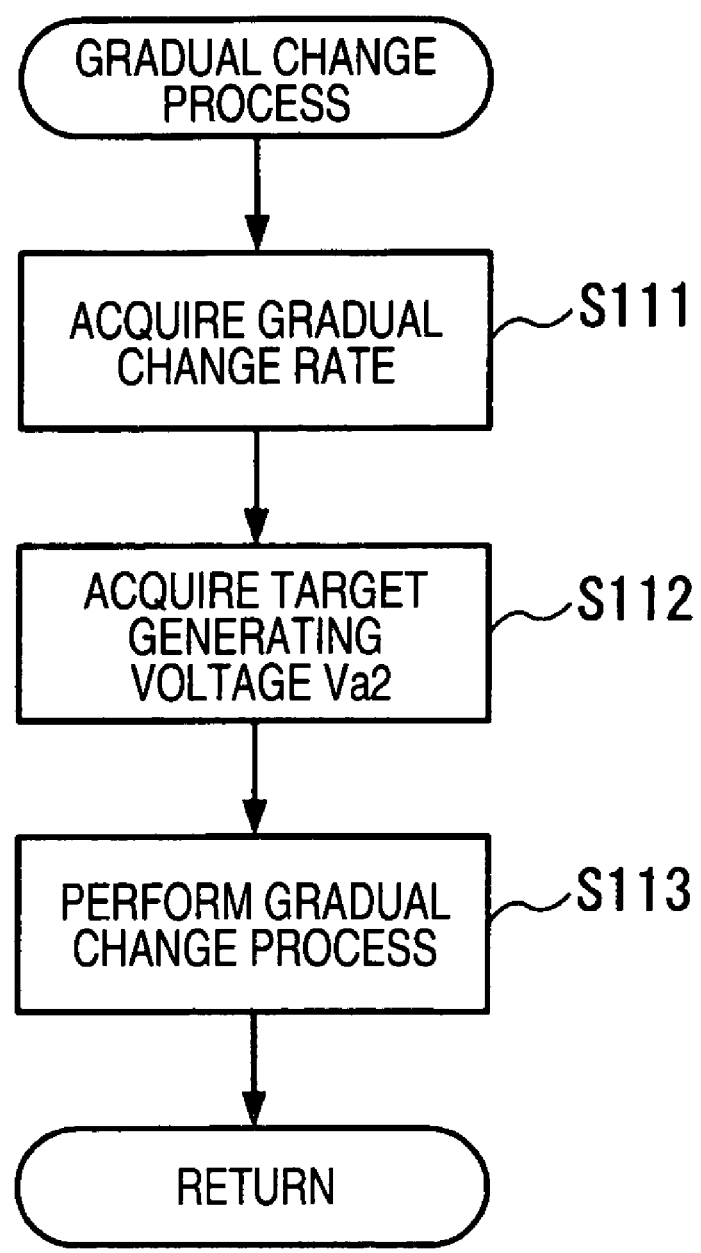
FIG. 17 is a diagram showing a gradual change process according to the first embodiment.

[Step S15] The CPU 34 performs the gradual change process which is shown in FIG. 17.

Figures 15, 16:
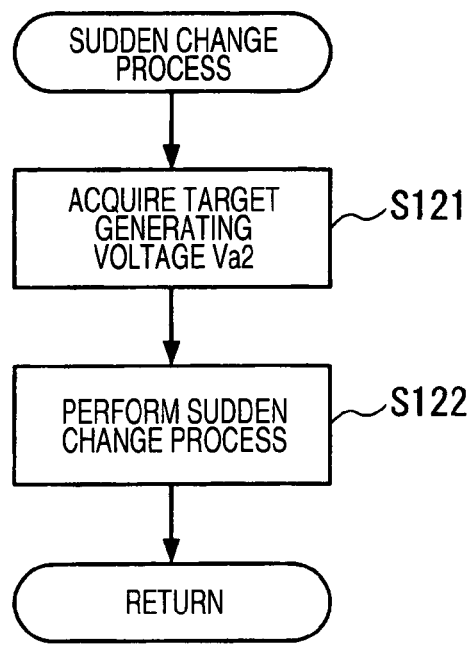
FIG. 15 is a diagram showing a second gradual change rate table according to the first embodiment.
FIG. 16 is a diagram showing a sudden change process according to the first embodiment.

[Step S16] The CPU 34 performs the sudden change process which is shown in FIG. 16.

According to the above-described processes, if it is determined that the gradual change process is required, since the generating voltage of the alternator 12 is gradually changed to the target generating voltage, the voltage of the battery 11 is not suddenly changed, thereby having no effect on operation of the electric components 13. If it is determined that the gradual change process is not required, since the generating voltage of the alternator 12 is suddenly changed to the target generating voltage, charging efficiency of the battery 11 is improved, whereby the battery 11 is rapidly charged.

Now, an example of the process at Step S11 in FIG. 4 will be described. For the purpose of performing this process, the gradual change requirement determining section 47 includes programs for a first former gradual change requirement determination process and a second former gradual change requirement determination process, which are selected as necessary.

To begin with, the first former gradual change requirement determination process performed by the gradual change requirement determining section 47 will be described.

As shown in FIG. 5, the gradual change requirement determining section 47 performs the following steps according to the program for the first former gradual change requirement determination process program.

[Step S21] The CPU 34 determines whether or not the electric components 13, for example, a light that flickers the generating voltage of the alternator 12 is suddenly changed and a wiper whose operation speed is rapidly changed when the generating voltage is suddenly changed, are being used. If it is determined that the electric components 13 is used, the process proceeds to Step S22. Otherwise, the process proceeds to Step S23.

[Step S22] Since flickering of the light and change of the operation speed of the wiper can be prevented by preventing the generating voltage of the alternator 12 from being suddenly changed, the CPU 34 determines that the gradual change process to gradually change the generating voltage of the alternator 12 to the target generating voltage is required.

[Step S23] Since the electric components 13 such as the light or the wiper is not used, and therefore, its operation is not affected although the voltage of the battery 11 is suddenly changed as the generating voltage of the alternator 12 is suddenly changed, the CPU 34 determines that the gradual change process is not required.

According to the above described processes, it is determined whether or not the gradual change process is required, based on the using status of the electric components 13 such as the light that flickers or the wiper whose operation speed is rapidly changed when the generating voltage of the alternator 12 is suddenly changed.

Next, the second former gradual change requirement determination process performed by the gradual change requirement determining section 47 will be described.

As shown in FIG. 6, the gradual change requirement determining section 47 performs the following steps according to a program for the second former gradual change requirement determination process.

[Step S31] The CPU 34 acquires information on a position and a driving path of the vehicle, which are acquired by the car navigator 21.

[Step S32] The CPU 34 acquires weather information acquired by the radio 22 through a FM teletext or the like.

[Step S33] The CPU 34 acquires time information from a electric component having a clock function.

[Step S34] The CPU 34 predicts a using status of the electric components 13 based on the position and driving path information, the weather information and the time information of the vehicle. For example, if the acquired time information indicates evening or if the acquired position and driving path information indicates that the vehicle is about to go into a tunnel, the light is predicted to be turned on. In addition, if the weather information indicates that it is likely to rain, the wiper is predicted to be actuated.

[Step S35] The CPU 34 determines whether or not there is one of electric components 13 to be predicted to operate soon. If it is determined that there is one of electric components 13 to be predicted to operate soon, the process proceeds to Step S36. Otherwise, the process proceeds to Step S37.

[Step S36] The CPU 34 determines that the gradual change process is required.

[Step S37] The CPU 34 determines that the gradual change process is not required.

According to the above-described processes, it is determined whether or not the gradual change process is required, based on the predicted using status of the electric component such as the light or wiper.

Next, an example of the process at Step S13 in FIG. 4 will be described. For the purpose of performing this process, the gradual change requirement determining section 47 includes programs for a first latter gradual change requirement determination process, a second latter gradual change requirement determination process, a third gradual change requirement determination process, and/or a fourth latter gradual change requirement determination process, which are selected as necessary.

To begin with, the first latter gradual change requirement determination process performed by the gradual change requirement determining section 47 will be described.

Figure 7:
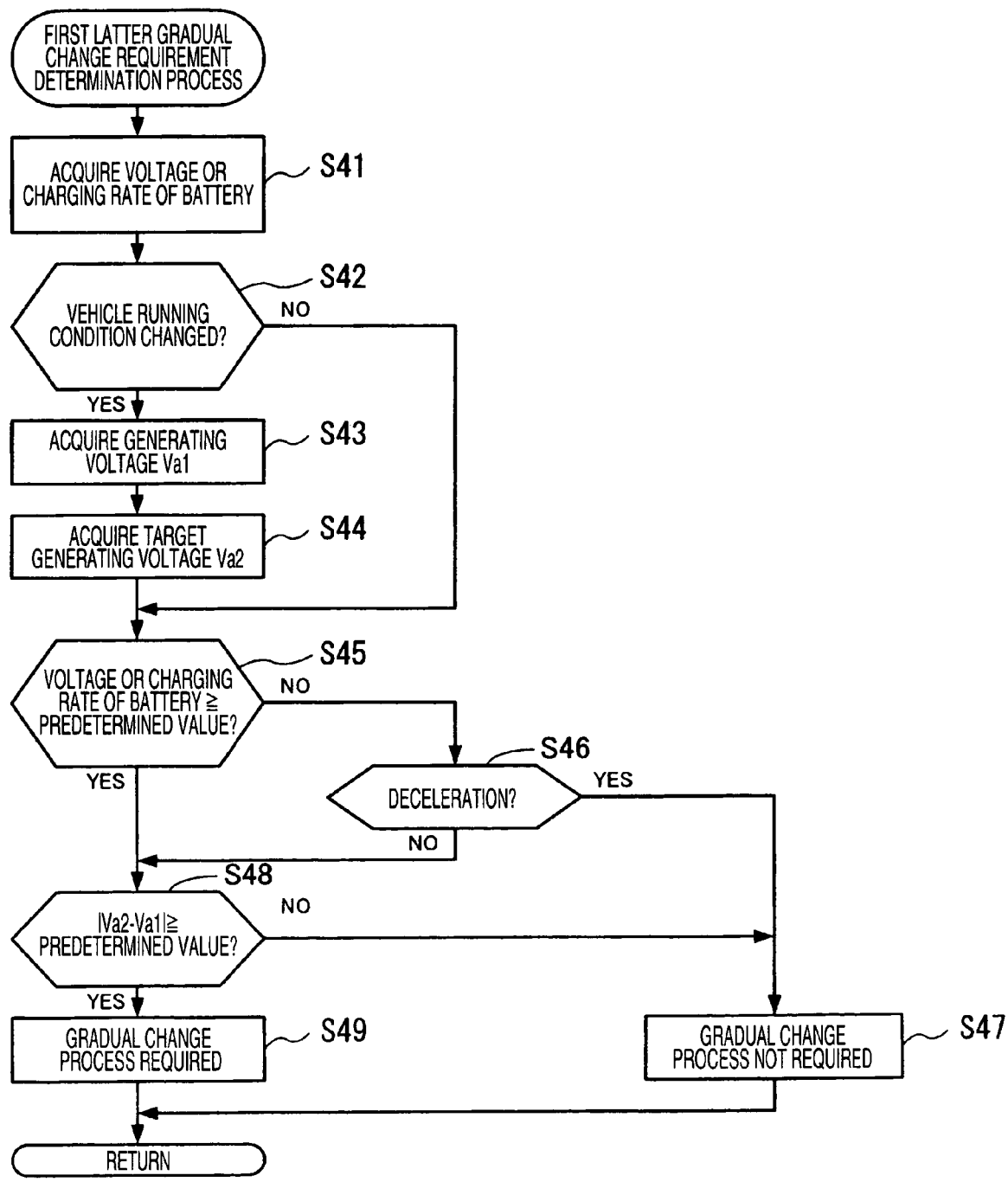
FIG. 7 is a flow chart showing a first latter gradual change requirement determination process at a first latter stage according to the first embodiment.

If it is determined that the gradual change process is required after completion of Step S12, as shown in FIG. 7, the gradual change requirement determining section 47 performs the following steps according to the program for the first latter gradual change requirement determination process.

[Step S41] The CPU 34 acquires the voltage of the battery 11, which is detected by the voltage sensor 15, and a charging rate according to the voltage.

Figure 8:
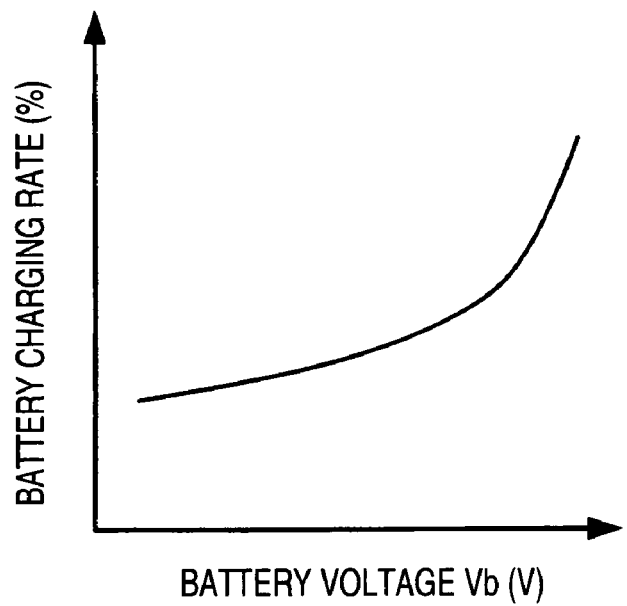
FIG. 8 is a diagram showing a relationship between a battery voltage and a charging rate according to the first embodiment according to the first embodiment.
Figure 9:
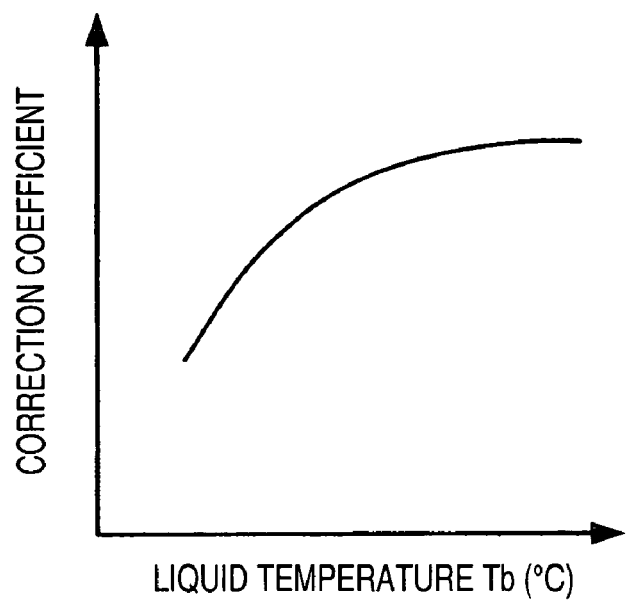
FIG. 9 is a diagram showing a relationship between liquid temperature and a correction coefficient of a charging rate according to the first embodiment.

Here, the charging rate is acquired based on the acquired voltage of the battery 11. That is, as shown in FIG. 8, since the battery 11 has a characteristic that the charging rate is varied depending on the voltage Vb, the CPU 34 acquires the charging rate corresponding to the voltage Vb of the battery 11 from the ROM 35 in which data on the voltage characteristic of the battery 11 are stored. In addition, since the battery 11 has a characteristic that the charging rate is varied depending on the liquid temperature Tb, it is necessary to correct the charging rate depending on the liquid temperature Tb. Accordingly, the CPU 34 acquires a correction coefficient of the charging rate corresponding to the liquid temperature of the battery 11 from the ROM 35 in which data on the temperature characteristic as shown in FIG. 9 are stored, and corrects the charging rate of the battery 11 by multiplying the charging rate of the battery 11 by the correction coefficient.

[Step S42] The CPU 34 acquires vehicle running condition related to idle, acceleration, constant speed and deceleration and determines whether or not the vehicle running condition are varied, based on information from the electronic control unit that controls the engine of the vehicle. If it is determined that the vehicle running condition are varied, the process proceeds to Step S43. Otherwise, the process proceeds to Step S45.

[Step S43] The CPU 34 acquires a generating voltage Va1 of the alternator 12 detected by the voltage sensor 19.

[Step S44] The CPU 34 acquires a target generating voltage Va2. Since the target generating voltage Va2 of the alternator 12 is set depending on the vehicle running condition, the CPU 34 acquires the target generating voltage Va2 corresponding to variation of the vehicle running condition.

[Step S45] The CPU 34 determines whether or not the voltage or charging rate of the battery 11 is more than a predetermined value. If it is determined that the voltage or charging rate of the battery 11 is more than the predetermined value, the process proceeds to Step S48. Otherwise, the process proceeds to Step S46.

[Step S46] The CPU 34 determines whether or not the vehicle running condition is in deceleration. If it is determined that the vehicle running condition is in deceleration, the process proceeds to Step S47. Otherwise, the process proceeds to Step S48.

[Step S47] The CPU 34 determines that the gradual change process is not required.

The processes in Steps S45, S46 and S47 instantaneously change the generating voltage of the alternator 12 to the target generating voltage by forcibly making the gradual change process unnecessary in a case where the vehicle running condition is in deceleration in which the alternator 12 can generate more power when the voltage or charging rate of the battery is decreased. Accordingly, the battery 11 whose voltage or charging rate is decreased can be rapidly charged in deceleration of the vehicle.

[Step S48] The CPU 34 determines whether or not a difference between the target generating voltage Va2 and the generating voltage Va1 of the alternator 12 is more than a predetermined value. If it is determined that the difference is more than the predetermined value, the process proceeds to Step S49. Otherwise, the process proceeds to Step S47.

[Step S49] Since the difference between the generating voltage of the alternator 12 and the target generating voltage is large, The CPU 34 determines that the gradual change process is required to prevent the generating voltage of the alternator 12 from being suddenly changed.

According to the above-described processes, it is determined whether or not the gradual change process is required, based on the difference between the target generating voltage Va2, which corresponds to the vehicle running condition, and the generating voltage Va1 of the alternator 12.

Next, the second latter gradual change requirement determination process performed by the gradual change requirement determining section 47 will be described.

Figure 10:
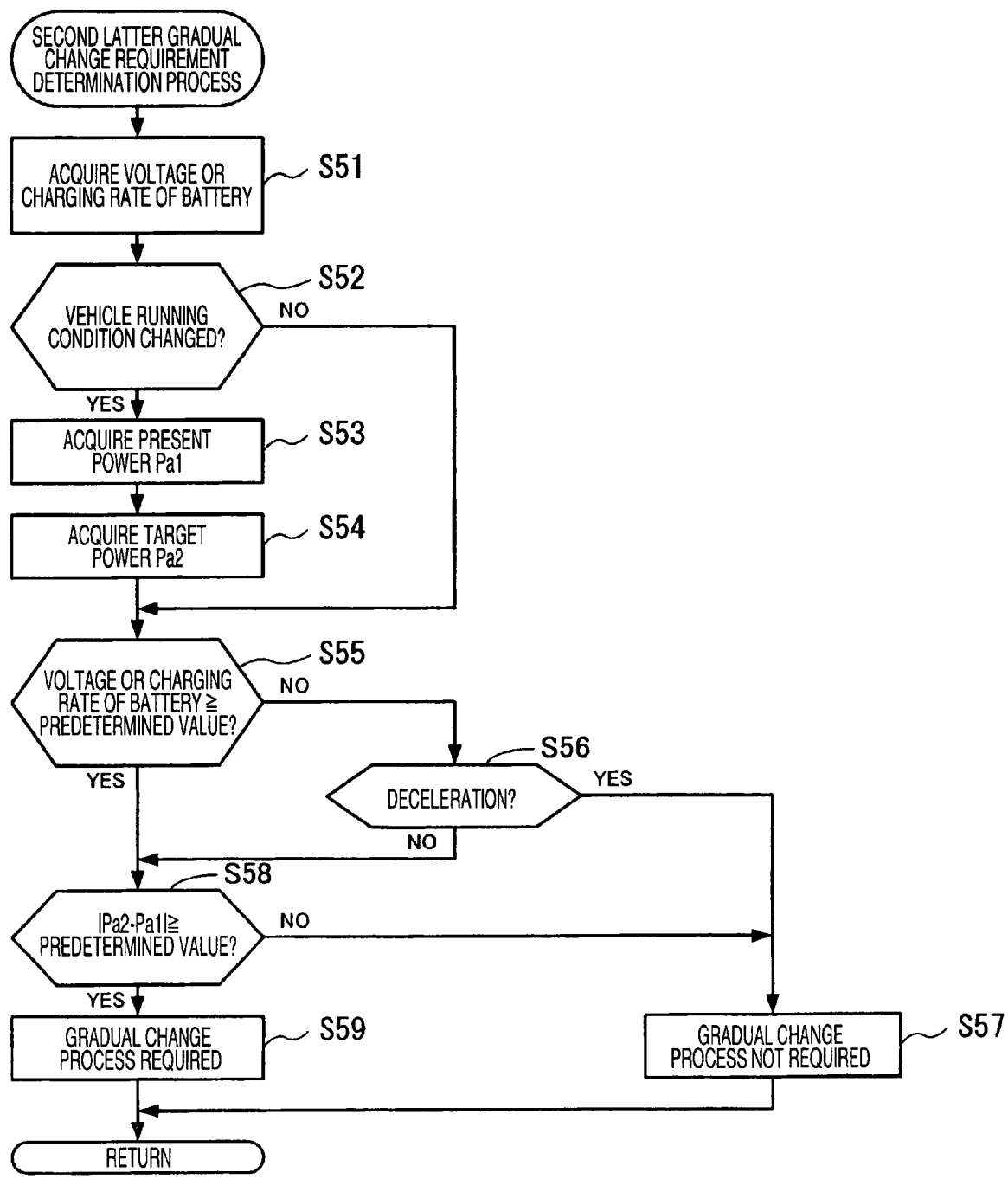
FIG. 10 is a flow chart showing a second latter gradual change requirement determination process according to the first embodiment.

As shown in FIG. 10, the second latter gradual change requirement determination process is different from the first latter gradual change requirement determination process in that the target generating voltage Va2 and the generating voltage Va1 of the alternator 12 are changed to target power Pa2 and present power Pa1 of the alternator 12, respectively. Thus, in Step S58, the CPU 34 determines whether or not a difference between the target power Pa2 and the present power Pa1 of the alternator 12 is more than a predetermined value. Power of the alternator 12 is calculated from the generating voltage and generating current of the alternator 12, which are detected by the voltage sensor 19 and the current sensor 20, respectively.

According to the above-described processes, it is determined whether or not the gradual change process is required, based on the difference between the target power based on the target generating voltage, which corresponds to the vehicle running condition, and the present power based on the generating voltage of the alternator 12.

Next, the third latter gradual change requirement determination process performed by the gradual change requirement determining section 47 will be described.

Figure 11:
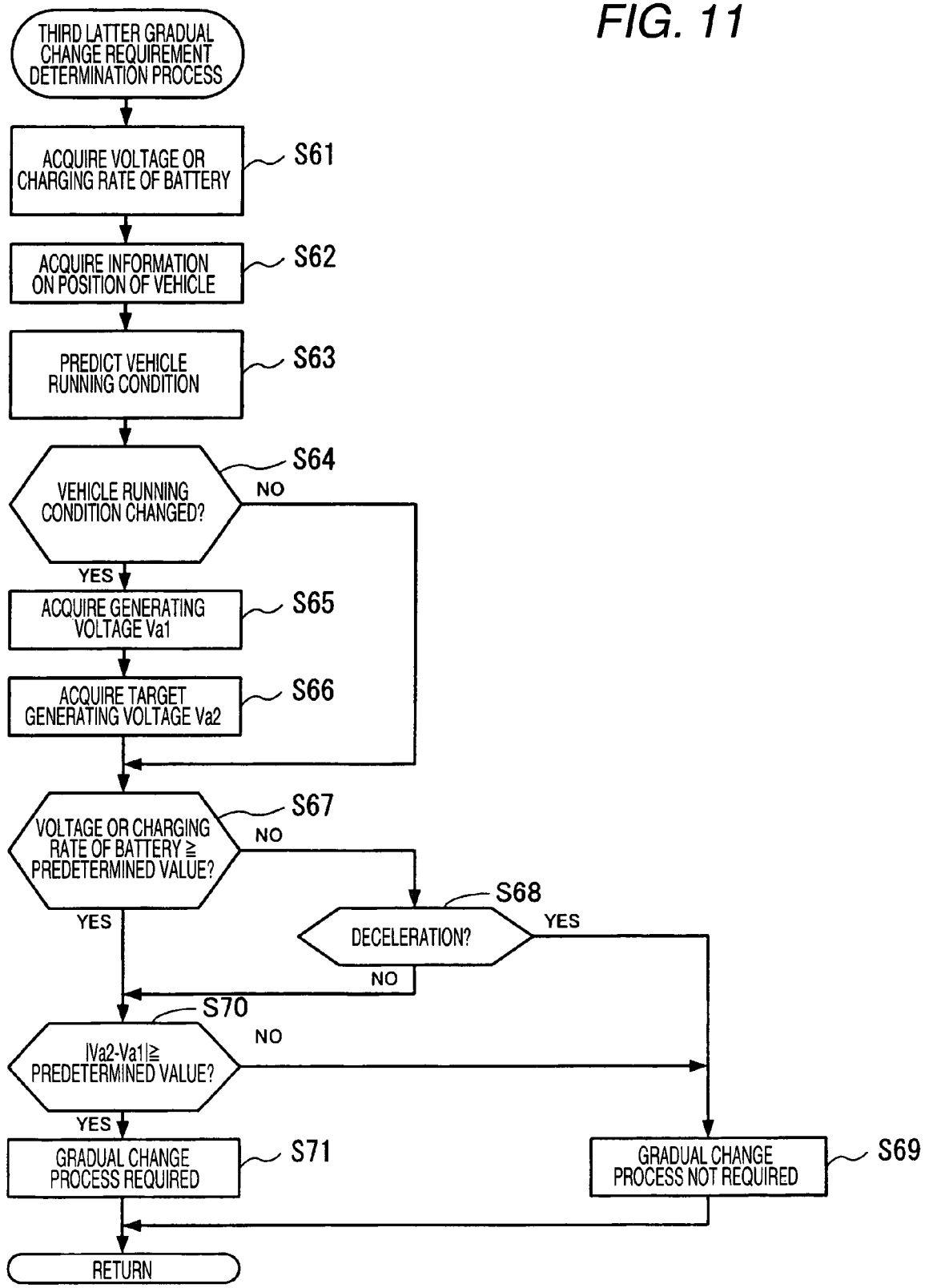
FIG. 11 is a flow chart showing a third latter gradual change requirement determination process according to the first embodiment.

If it is determined that the gradual change process is required after completion of Step S12, as shown in FIG. 11, the gradual change requirement determining section 47 performs the following steps according to the program for the third latter gradual change requirement determination process.

[Step S61] The CPU 34 acquires the voltage of the battery 11, which is detected by the voltage sensor 15, or a charging rate according to the voltage.

[Step S62] The CPU 34 acquires information on a position and a driving path of the vehicle, which are acquired by the car navigator 21.

[Step S63] The CPU 34 predicts the vehicle running condition based on the information on the position and the driving path of the vehicle. For example, the vehicle running condition is predicted to change to acceleration if the vehicle encounters an uphill road, while the vehicle running condition is predicted to change to deceleration if the vehicle encounters a downhill road. In addition, the vehicle running condition is predicted to change to deceleration if a traffic light is predicted to turn red.

[Step S64] The CPU 34 determines whether or not the vehicle running condition is changed, based on a result of the prediction in Step S63.

If it is determined that the vehicle running condition is changed, the process proceeds to Step S65. Otherwise, the process proceeds to Step S67.

[Step S65] The CPU 34 acquires the generating voltage Va1 of the alternator 12, which is detected by the voltage sensor 19.

[Step S66] The CPU 34 acquires the target generating voltage Va2 of the alternator 12.

[Step S67] The CPU 34 determines whether or not the voltage or the charging rate of the battery 11 is more than a predetermined value. If it is determined that the voltage or the charging rate of the battery 11 is more than the predetermined value, the process proceeds to Step S70. Otherwise, the process proceeds to Step S68.

[Step S68] The CPU 34 determines whether or not the vehicle running condition is in deceleration. If it is determined that the vehicle running condition is in deceleration, the process proceeds to Step S69. Otherwise, the process proceeds to Step S70.

[Step S69] The CPU 34 determines that the gradual change process is not required.

[Step S70] The CPU 34 determines whether or not a difference between the target generating voltage Va2 and the generating voltage Va1 of the alternator 12 is more than a predetermined value. If it is determined that the difference is more than the predetermined value, the process proceeds to Step S71. Otherwise, the process proceeds to Step S69.

[Step S71] The CPU 34 determines that the gradual change process is required.

According to the above-described processes, it is determined whether or not the gradual change process is required, based on the difference between the target generating voltage, which corresponds to the predicted vehicle running condition, and the generating voltage of the alternator 12.

Next, the fourth latter gradual change requirement determination process performed by the gradual change requirement determining section 47 will be described.

Figure 12:
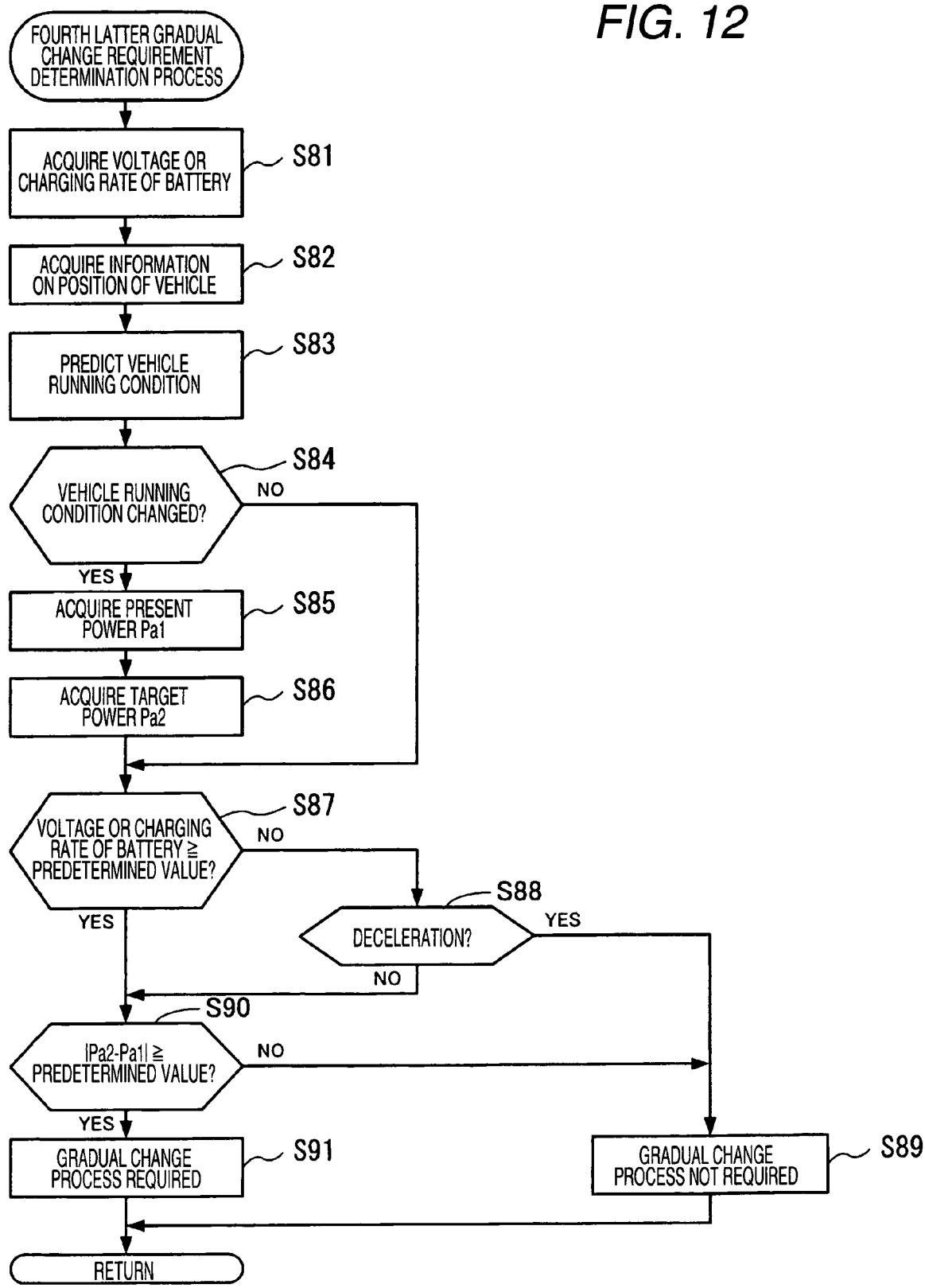
FIG. 12 is a flow chart showing a fourth latter gradual change requirement determination process according to the first embodiment.

As shown in FIG. 12, the fourth latter gradual change requirement determination process is different from the third latter gradual change requirement determination process in that the target generating voltage Va2 and the generating voltage Va1 of the alternator 12 are changed to target power Pa2 and present power Pa1 of the alternator 12, respectively. Thus, in Step S90, the CPU 34 determines whether or not a difference between the target power Pa2 and the present power Pa1 of the alternator 12 is more than a predetermined value.

According to the above-described processes, it is determined whether or not the gradual change process is required, based on the difference between the target power based on the target generating voltage, which corresponds to the predicted vehicle running condition, and the present power based on the generating voltage of the alternator 12.

Next, the gradual change rate decision process performed by the gradual change rate deciding section 48 will be described.

Figure 13:
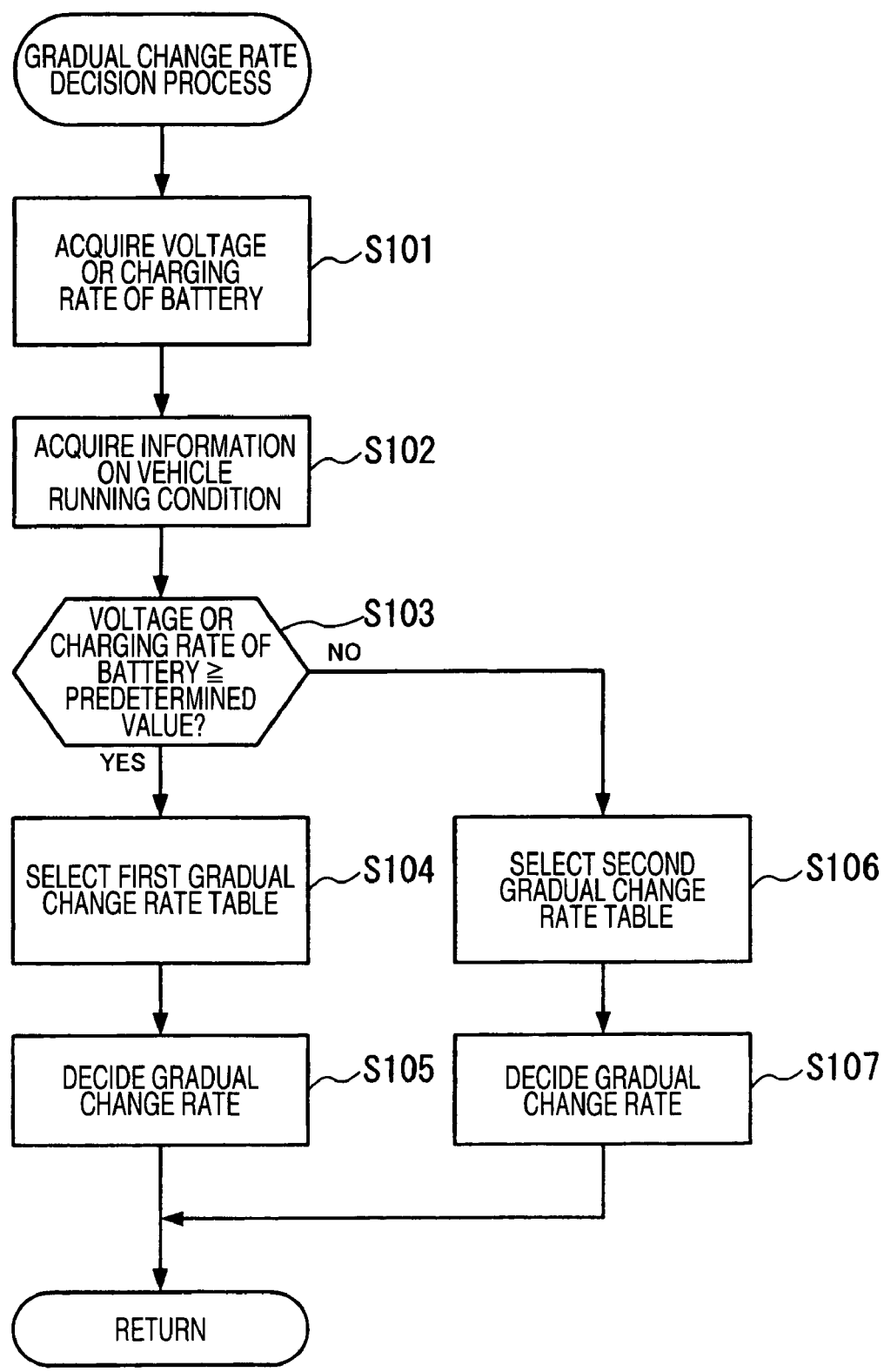
FIG. 13 is a flow chart showing a gradual change rate decision process according to the first embodiment.

If it is determined that the gradual change process is required according to the processes of the flow chart of FIG. 4, as shown in FIG. 13, the gradual change rate deciding section 48 performs the following steps according to the program for the gradual change decision process.

[Step S101] The CPU 34 acquires the voltage of the battery 11, which is detected by the voltage sensor 15, or a charging rate according to the voltage.

[Step S102] The CPU 34 acquires information on running condition of the vehicle before being changed, and running condition of the vehicle after being changed, based on information from the electronic control unit that controls the engine of the vehicle.

[Step S103] The CPU 34 determines whether or not the voltage or charging rate of the battery 11 is more than a predetermined value. If it is determined that the voltage or charging rate of the battery 11 is more than the predetermined value, the process proceeds to Step S104. Otherwise, the process proceeds to Step S106.

[Step S104] The CPU 34 selects the first gradual change rate table for deciding gradual change rates. As shown in FIG. 14, gradual change rates based on the running condition of the vehicle before being changed, the running condition of the vehicle after being changed, and determination on whether or not the power of the alternator 12 is cut are stored in the first gradual change rate table.

[Step S105] The CPU 34, refers to the ROM 35 in which the first gradual change rate table is stored, and then decides a gradual change rate based on running condition of the vehicle before being changed, the running condition of the vehicle after being changed, and the determination on whether or not power of the alternator 12 is cut.

Here, the electronic control it that controls the engine of the vehicle has a function to prioritize torque of the engine over generating the power when the running condition is acceleration. With this function, the target generating voltage of the alternator 12 is cut by, for example, 5%. In this case, the gradual change rate is set to be high and the generating voltage of the alternator 12 is suddenly changed to the target generating voltage, and therefore, the torque of the engine is raised.

[Step S106] The CPU 34 selects the second gradual change rate table for deciding the gradual change rate. As shown in FIG. 15, gradual change rate based on the running condition of the vehicle before being changed and the running condition of the vehicle after being changed are stored in the second gradual change rate table. Since the gradual change rate is set to be higher in the second gradual change rate table than the first gradual change rate table, it is prioritized to charge the battery 11 when the voltage or charging rate of the battery 11 is low.

[Step S107] The CPU 34 decides a gradual change rate, based on the running condition of the vehicle before being changed and the running condition of the vehicle after being changed by referring to the ROM 35 in which the second gradual change rate table is stored. According to the above-described processes, one of the first and second gradual change rate tables is selected based on the voltage or charging rate of the battery 11. Specifically, when the first gradual change rate table in which low gradual change rates are set is selected, a gradual change rate is decided based on change of the vehicle rung condition and the determination on whether or not the power of the alternator 12 is cut, and, when the second gradual change rate table in which high gradual change rates are set is selected, a gradual change rate is decided based on change of the vehicle running condition.

Next, a sudden change process performed by the sudden change performing section 49 will be described.

As shown in FIG. 16, the sudden change performing section 49 performs the following steps according to the program fox the sudden change process.

[Step S121] The CPU 34 acquires the target generating voltage Va2 of the alternator 12, which is acquired by the processes of the flow chart of FIG. 4.

[Step S122] The CPU 34 performs the sudden change process in which the generating voltage Va1 of the alternator 12 is suddenly changed to the target generating voltage Va2.

Next, a gradual change process performed by the gradual change performing section 50 will be described.

As shown FIG. 17, the gradual change performing section 50 performs the following steps according to the program for the gradual change process.

[Step S111] The CPU 34 acquires the gradual change rate decided in Step S105 or Step 107.

[Step S112] The CPU 34 acquires the target generating voltage Va2 of the alternator 12, which is acquired by the processes of the flow chart of FIG. 4.

[Step S113] The CPU 34 performs the gradual change process in which the generating voltage of the alternator 12 is gradually changed to the target generating voltage according to the acquired gradual change rate.

In addition, although the charging control apparatus 10 is provided independently in the first embodiment, it may be built in the electronic control unit.

Hereinafter, a second embodiment of a charging control apparatus will be described in detail with reference to the accompanying drawings.

Figure 18:
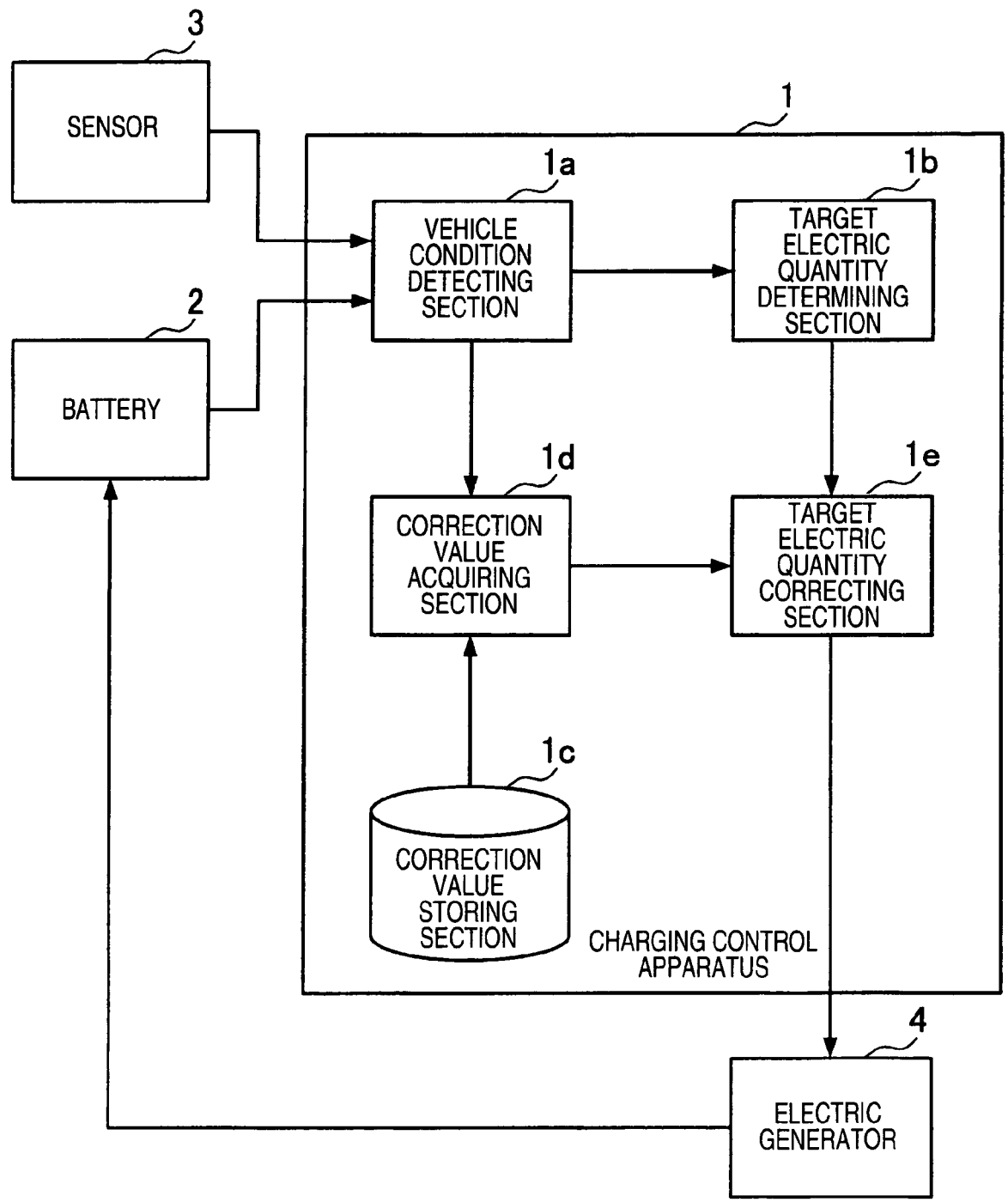
FIG. 18 is a schematic diagram according to a second embodiment of the invention.

As shown in FIG. 18, a charging control apparatus 1 includes a vehicle condition detecting section 1a, a target electric quantity determining section 1b, a correction value storing section 1c, a correction value acquiring section 1d, and a target electric quantity correcting section 1e. In addition, the charging control apparatus 1 is connected to a battery 2, a sensor 3 and an electric generator (alternator) 4.

The vehicle condition detecting section 1a detects vehicle conditions from the battery 2 and the sensor 3. For example, the vehicle condition detecting section 1a detects a voltage or a current output from the battery 2. In addition, the vehicle condition detecting section 1a detects using status of electric components installed in the vehicle from the sensor 3, and, for example, detects running condition of the vehicle from a throttle valve opening angle, a vehicle speed, RPM (revolution per minute) of an engine, etc.

The target electric quantity determining section 1b acquires information on vehicle conditions from the vehicle condition detecting section 1a and determines a target electric quantity to be output from the electric generator 4. Specifically, the target electric quantity determining section 1b acquires a voltage and current of the battery 2 from the vehicle condition detecting section 1a and determines the target electric quantity to be generated by the electric generator 4 from the voltage and current of the battery 2 and a target voltage of the battery 2.

The correction value storing section 1c preliminarily stores a correction value to correct the target electric quantity, which is determined by the target electric quantity determining section 1b, based on the vehicle conditions detected by the vehicle condition detecting section 1a.

The correction value acquiring section 1d acquires information on the vehicle conditions detected by the vehicle condition detecting section 1a. In addition, the correction value acquiring section 1d acquires the correction value to correct the target electric quantity based on the information on the vehicle conditions from the correction value storing section 1c.

Upon acquiring information on the target electric quantity from the target electric quantity determining section 1b, the target electric quantity correcting section 1e acquires the correction value to correct the target electric quantity from the correction value acquiring section 1d. Then, the target electric quantity correcting section 1e corrects the target electric quantity with the acquired correction value and instructs the electric generator 4 to charge the battery 2.

According to the instruction to charge the battery 2, the electric generator 4 outputs the electric quantity to charge the battery 2 based on the target electric quantity which is instructed by the target electric quantity correcting section 1e.

With the charging control apparatus 1 constructed as above, the vehicle condition detecting section 1a detects the vehicle conditions, the correction value acquiring section 1d reads the correction value to correct the target electric quantity based on the vehicle conditions from the correction value storing section 1c, and the target electric quantity correcting section 1e corrects the target electric quantity based on the read correction value. Accordingly, the target electric quantity is corrected with the correction value suitable for the vehicle conditions. Thus, the electric generator 4 can rapidly charge the battery 2.

Next, an embodiment in which the charging control apparatus according to the second embodiment is applied to a master ECU will be described.

Figure 19:
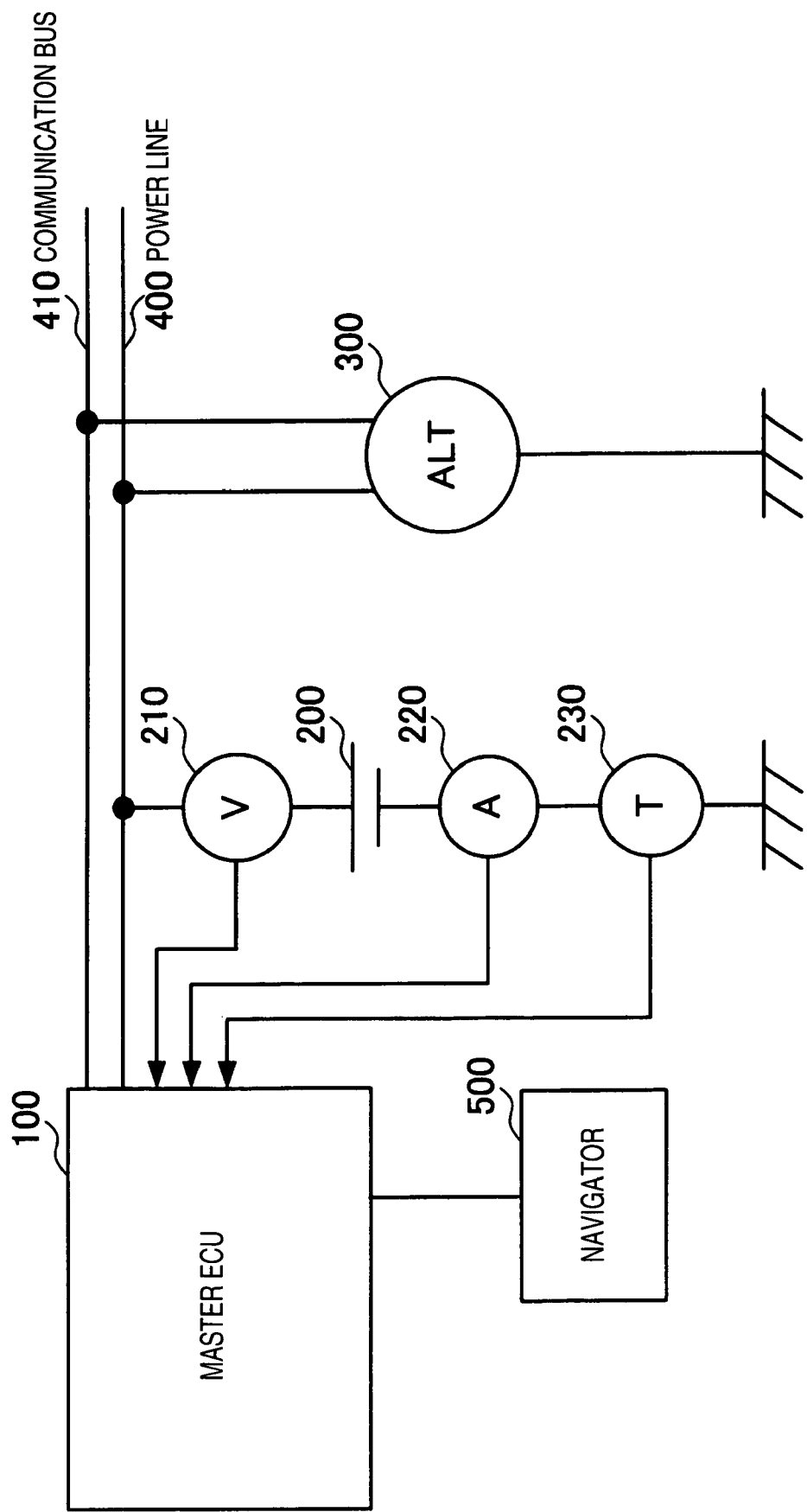
FIG. 19 is a schematic diagram showing a charging control system according to a second embodiment of the present invention.

As shown in FIG. 19, a master ECU (Electronic Control Unit) 100, a battery 200 and an alternator (ALT) 300 are interconnected via a power line 400. In addition, a navigator 500 is connected to the master ECU 100.

The battery 200 is connected to a voltmeter 210 that measures a voltage of the battery 200, an ammeter 220 that measures a current of the battery 200, and a thermometer 230 that measures a liquid temperature of the battery 200.

The master ECU 100 detects vehicle conditions via wires that interconnect the voltmeter 210, the ammeter 220, the thermometer 230 and the master ECU 100. For example, the master ECU 100 detects the voltage and current of the battery 200 from the voltmeter 210 and the ammeter 220, respectively. In addition, the master ECU 100 detects vehicle conditions including, for example, using status of electric components installed in a vehicle, vehicle situation indicating acceleration or deceleration of a vehicle, external environments of a vehicle, such as traffic congestion, atmospheric temperature, remaining fuel of a vehicle, via the wires from sensors (not shown) sensing the vehicle conditions. In addition, the master ECU 100 detects liquid temperature of the battery 200 from the thermometer 230.

In addition, the master ECU 100 calculates the target electric quantity to be output by the alternator 300, based on a target charging voltage of the battery 200 and the detected voltage of the battery 200. In this case, the target electric quantity may be a target power to be generated by the alternator 300. On the other hand, the master ECU 100 calculates a correction value to correct the calculated target electric quantity, based on the detected vehicle conditions. In addition, the master ECU 100 corrects the target electric quantity to be output by the alternator 300, based on the calculated correction value, and outputs an instruction signal to the alternator 300 via a communication bus 410.

Upon receiving the instruction signal from the master ECU 100, the alternator 300 output the electric quantity based on the instruction signal including the target electric quantity and charges the battery 200. In addition, the alternator 300 supplies the electric quantity to electric components installed in the vehicle. In this case the electric quantity may be a power generated by the alternator 300.

Figure 20:
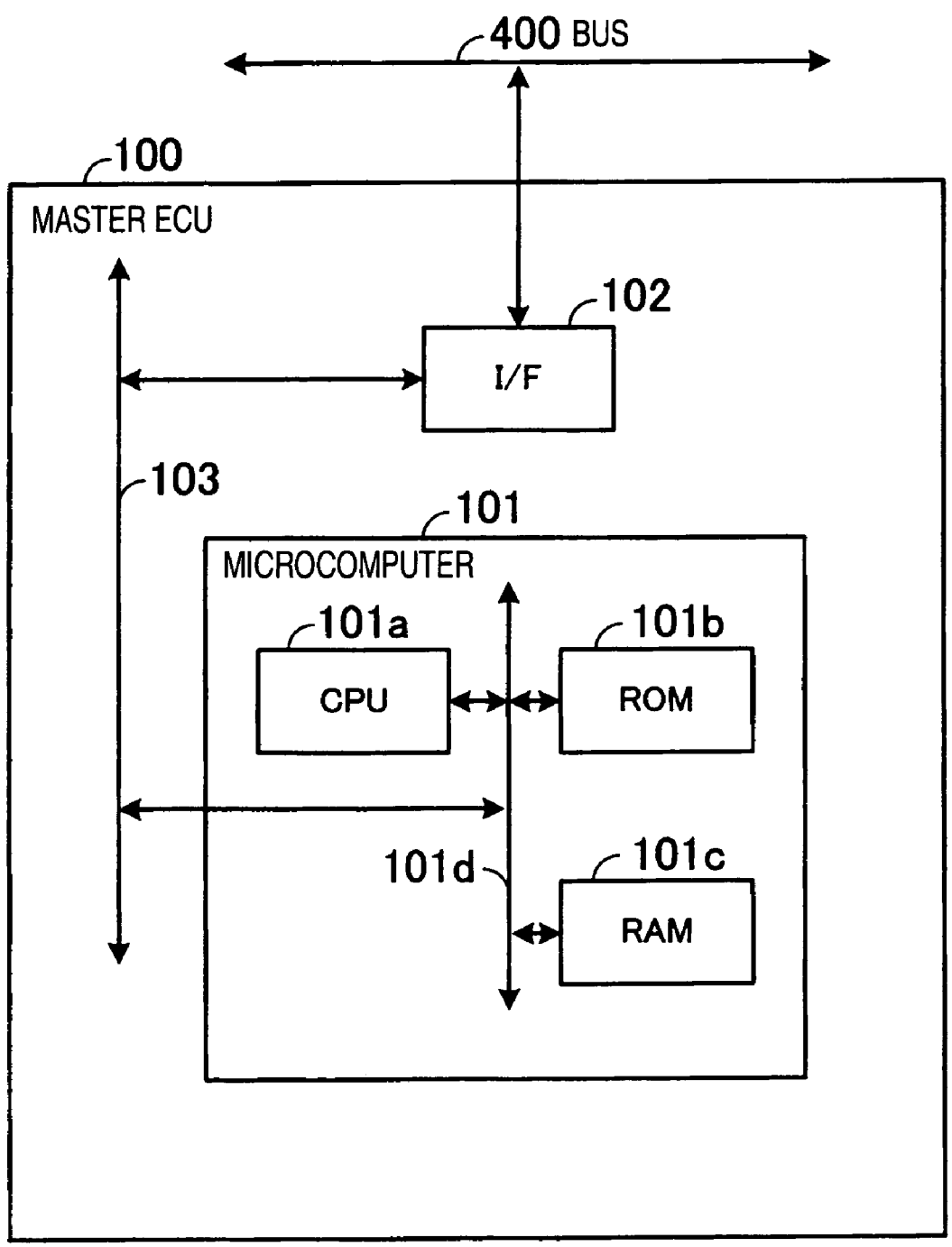
FIG. 20 is a schematic diagram showing a hardware configuration of the charging control apparatus according to the second embodiment.

As shown in FIG. 20, the master ECU 100 comprises a microcomputer 101, an I/F (interface) 102 and a bus 103, and is connected to, for example, an external bus 400 via the I/F 102.

The microcomputer 101 comprises a CPU (Central Processing Section) 101a, a ROM (Read Only Memory) 101b and a RAM (Random Access Memory) 101c. The master ECU 100 is controlled as a whole by the CPU 101a. The ROM 101b and the RAM 101c are connected to the CPU 101a via an internal bus 101d of the microcomputer 101.

A program of an OS (Operating System) or at least a part of an application program to be executed by the CPU 101a is temporarily stored in the RAM 101c. In addition, various kinds of data required for processes by the CPU 101a are stored in the RAM 101c. An OS and application programs are stored in the ROM 101b.

In addition, hardware of the master ECU 100 is not limited to the configuration shown in FIG. 20. For example, a ROM may be connected to the bus 103 and the OS or the application programs may be stored in this ROM. In addition, a RAM may be connected to the bus 103 and data may be temporarily stored in this RAM. Various process functions of the second embodiment can be realized by the above-described hardware configuration.

Next, process functions of the master ECU 100 will be described.

Figure 21:
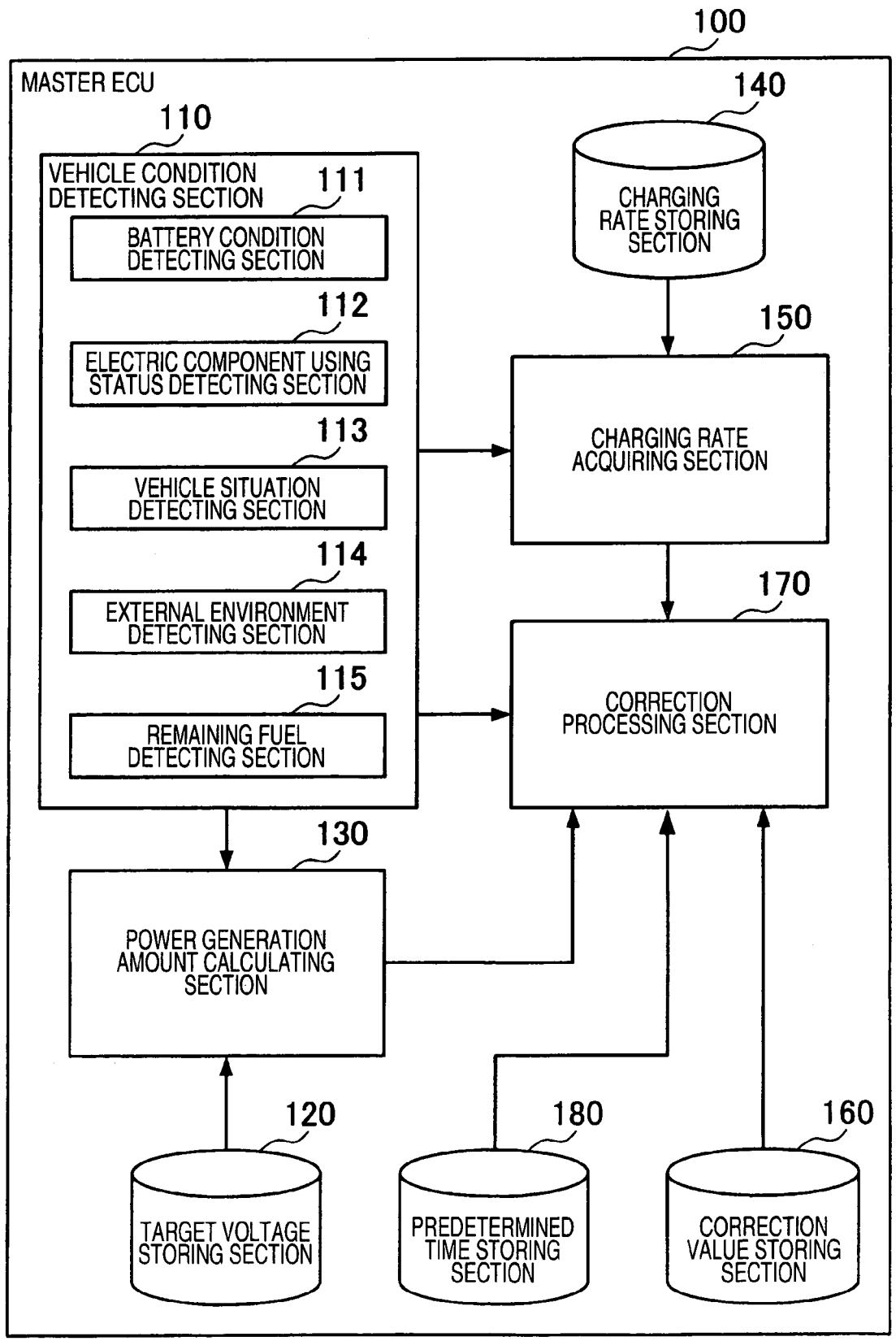
FIG. 21 is a schematic diagram showing functional configuration of the charging control apparatus.

As shown in FIG. 21, the master ECU 100 comprises a vehicle condition detecting section 110, a target voltage storing section 120, a power generation amount calculating section 130, a charging rate storing section 140, a charging rate acquiring section 150, a correction value storing section 160, a correction processing section 170 and a predetermined time storing section 180.

The vehicle condition detecting section 110 detects vehicle conditions. The vehicle conditions refer to conditions of the battery installed in a vehicle, using status of electric components installed in a vehicle, vehicle situation indicating, such as acceleration or deceleration of a vehicle, external information of a vehicle, such as traffic congestion on a traveling path to a destination set in a vehicle and atmospheric temperature, remaining fuel of a vehicle, etc.

The vehicle condition detecting section 110 comprises a battery condition detecting section 111, an electric component using status detecting section 112, a vehicle situation detecting section 113, an external environment detecting section 114 and a remaining fuel detecting section 115 for detecting various conditions of the vehicle.

The battery condition detecting section 111 detects the voltage of the battery 200 from the voltmeter 210, the current from the ammeter 220, and the liquid temperature from the thermometer 230.

The electric component using status detecting section 112 detects the using status of the electric components installed in the vehicle. For example, the electric component using status detecting section 112 detects whether or not an air conditioner installed in the vehicle is used and intensity of wind from the air conditioner. Specifically, the electric component using status detecting section 112 detects using status of the air conditioner from an ECU attached to the air conditioner.

The vehicle situation detecting section 113 detects vehicle situation that indicates running condition of the vehicle, such as acceleration, deceleration, constant speed, idle or racing, which are obtained based on a throttle valve opening angle, RPM (revolution per minute) of an engine, a vehicle speed, etc., from sensors (not shown).

The external environment detecting section 114 detects external environments of the vehicle, which are external information related to running of the vehicle. Specifically, the external environment detecting section 114 detects external information such as traffic congestion on a traveling path to a destination set in the navigator 500 connected to the master ECU 100, weather information such as atmospheric temperature.

The remaining fuel detecting section 115 detects remaining fuel of the vehicle.

The target voltage storing section 120 stores a voltage at which the battery is full-charged, as a target voltage for charging of the battery 200 (Namely, a target charging voltage of the battery).

The power generation amount calculating section 130 acquires the target charging voltage of the battery 200 from the target voltage storing section 120 and acquires the voltage of the battery 200 from the battery condition detecting section 111. In addition, based on a difference between both voltages, the power generation amount calculating section 130 calculates a target voltage to be generated by the alternator 300.

A battery charging rate corresponding to an open voltage of the battery 200 is stored in the charging rate storing section 140. In addition, a correction value to correct the battery charging rate corresponding to liquid temperature of the battery 200 is stored in the charging rate storing section 140.

Hereinafter, a relationship between the open voltage of the battery and the battery charging rate which is stored in the charging rate storing section 140 and a relationship between the liquid temperature and the battery charging rate will be described.

Figure 22:
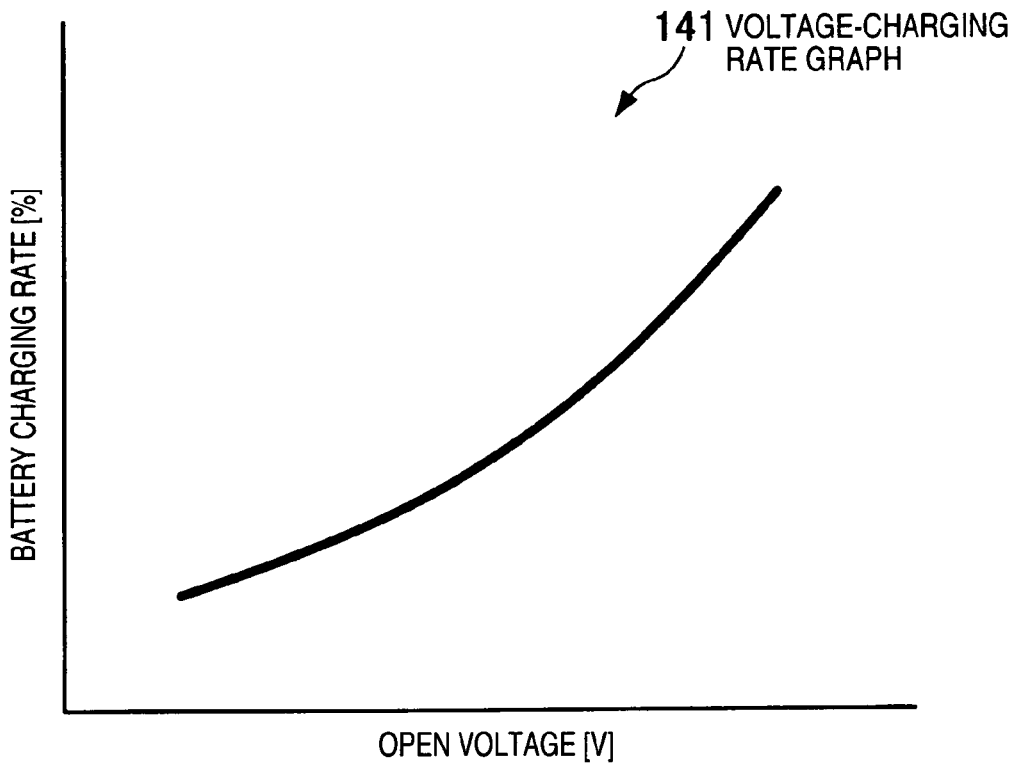
FIG. 22 is a diagram showing a relationship between an open voltage of a battery and a battery charging rate according to the second embodiment.

As shown in FIG. 22, a voltage-charging rate graph 141 shows that the battery charging rate is set to correspond to the open voltage of the battery 200. That is, the battery charging rate can be obtained by the open voltage of the battery 200, which is calculated by the master ECU 100, and the voltage-charging rate graph 141 which is stored in the charging rate storing section 140.

The voltage-charging rate graph 141 shows that the battery charging rate increases as the open voltage increases. That is, when the battery 200 is charged and the open voltage is calculated, if the open voltage increases with respect to the open voltage calculated before charging, the battery charging rate increases.

Figure 23:
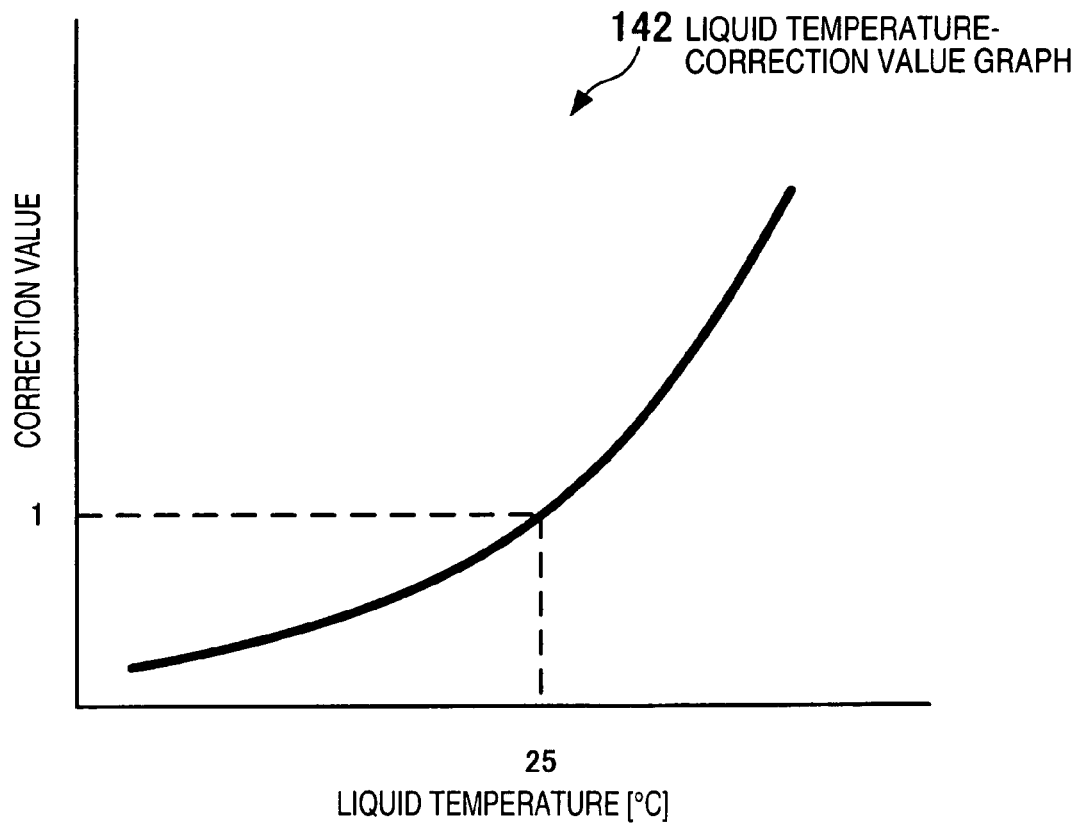
FIG. 23 is a diagram showing a relationship between a liquid temperature and a correction value of a battery charging rate according to the second embodiment.

As shown in FIG. 23, a liquid temperature-correction value graph 142 shows that a correction value to correct the battery charging rate is set to correspond to the liquid temperature.

In addition, the liquid temperature-correction value graph 142 shows that the correction value is 1 when the liquid temperature is 25° C. That is, there is no need to correct the battery charging rate obtained from the open voltage shown in FIG. 22 when the liquid temperature is 25° C. In addition, the battery charging rate is corrected by multiplying the battery charging rate obtained from the open voltage by the correction value.

Returning to FIG. 21, process functions of the master ECU 100 will be described.

The charging rate acquiring section 150 acquires the voltage and the current of the battery 200 from the battery condition detecting section 111 and calculates an internal resistance of the battery 200 based on the acquired voltage and current. In addition, the charging rate acquiring section 150 calculates the open voltage of the battery based on the voltage and the current of the battery 200 and the calculated internal resistance of the battery 200. The open voltage is calculated according to the following equation (1).

Voltage of battery 200−(current of battery 200×internal resistance of battery 200)=open voltage of battery     (1)

In the above equation (1), a term in parentheses is positive when the battery 200 is charged and the term in parentheses is negative when the battery 200 is discharged.

After calculating the open voltage, the charging rate acquiring section 150 acquires the battery charging rate corresponding to the open voltage from the charging rate storing section 140. In addition, the charging rate acquiring section 150 acquires the liquid temperature from the battery condition detecting section 111 and the correction value of the battery charging rate corresponding to the liquid temperature, and corrects the calculated battery charging rate based on the acquired correction value. The charging rate acquiring section 150 instructs the correction processing section 170 to correct a voltage calculated by the power generation amount calculating section 130 if the corrected battery charging rate is less than a predetermined value.

For example, the charging rate acquiring section 150 instructs the correction processing section 170 to correct the voltage if the corrected battery charging rate is less than 75%. Specifically, the charging rate acquiring section 150 instructs the correction processing section 170 to intermittently correct the voltage if the corrected battery charging rate is between 50 to 75% and constantly correct the voltage if the corrected battery charging rate is less than 50%.

A correction value to correct the voltage calculated by the power generation amount calculating section 130 is stored in the correction value storing section 160 in correspondence to vehicle conditions. For example, the correction value to correct the voltage is stored in correspondence to the battery charging rate, the liquid temperature, the amount of current consumed by the electric components, and the running condition of the vehicle.

Hereinafter, a relationship between the correction value and each of the battery charging rate, the liquid temperature and the consumption current consumed by the electric components, which are stored in the correction value storing section 160, will be described.

Figure 24:
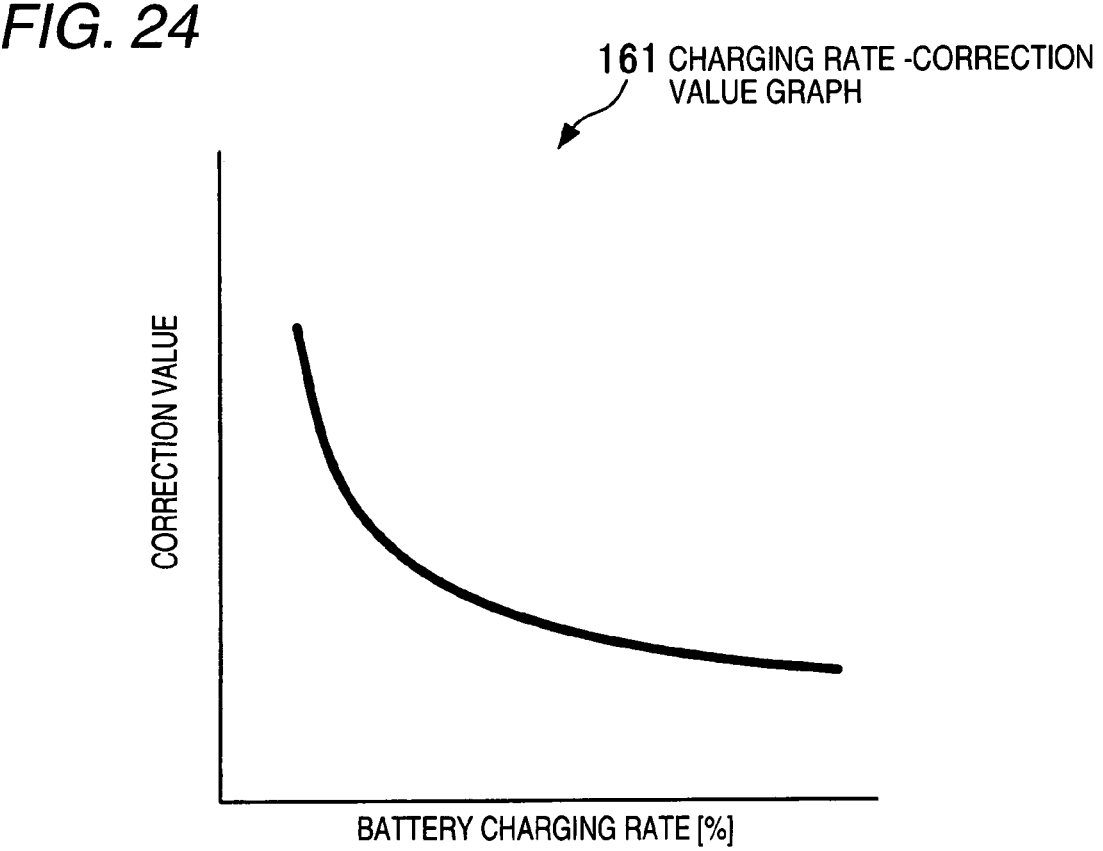
FIG. 24 is a diagram showing a relationship between a battery charging rate and a correction value of a voltage according to the second embodiment.

As shown in FIG. 24, a charging rate-correction value graph 161 shows that the correction value to correct the voltage calculated by the power generation amount calculating section 130 is set to correspond to the battery charging rate.

This correction value is set to be low when the battery charging rate is high and to be high when the battery charging rate is low. This is based on the requirement that the battery charging rate has to increase faster as the battery charging rate is lower since a danger of rising of a battery voltage increases as the battery charging rate is lower.

Figure 25:
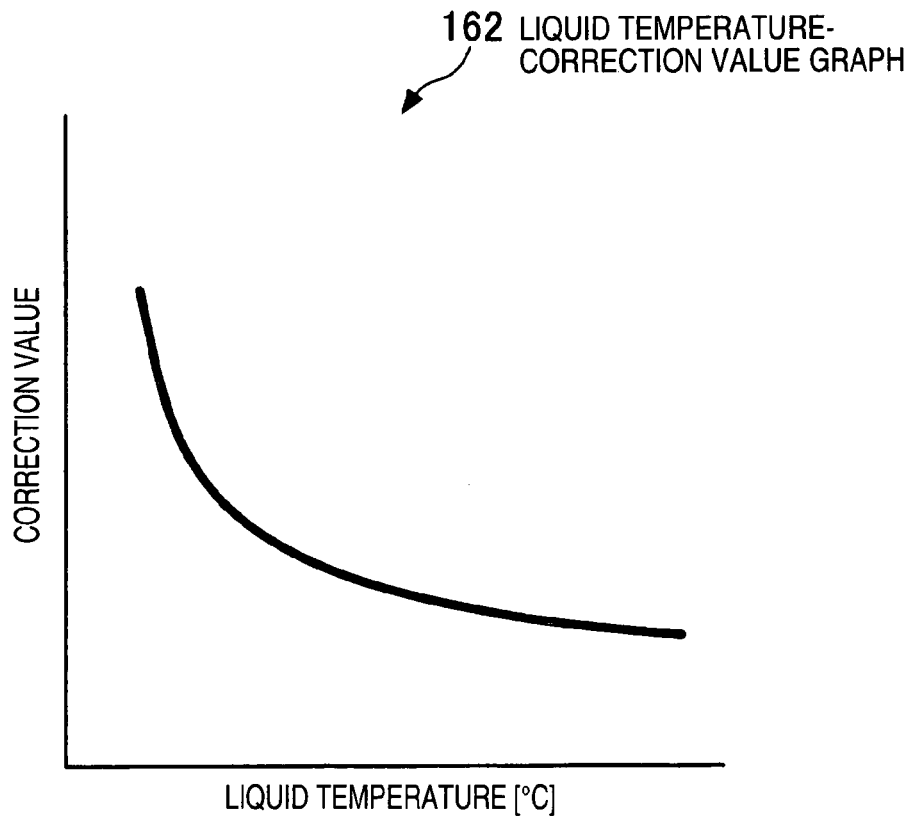
FIG. 25 is a diagram showing a relationship between a liquid temperature and a correction value of a voltage according to the second embodiment.

As shown in FIG. 25, a liquid temperature-correction value graph 162 shows that the correction value to correct the voltage calculated by the power generation amount calculating section 130 is set to correspond to the liquid temperature.

This correction value is set to be low when the liquid temperature is high and to be high when the liquid temperature is low. This is based on the requirement that the battery 200 has to be charged to a high voltage when the liquid temperature is low, which is higher than a voltage when the liquid temperature is high, since acceptance of a charging current is deteriorated when the liquid temperature is low.

Figure 26:
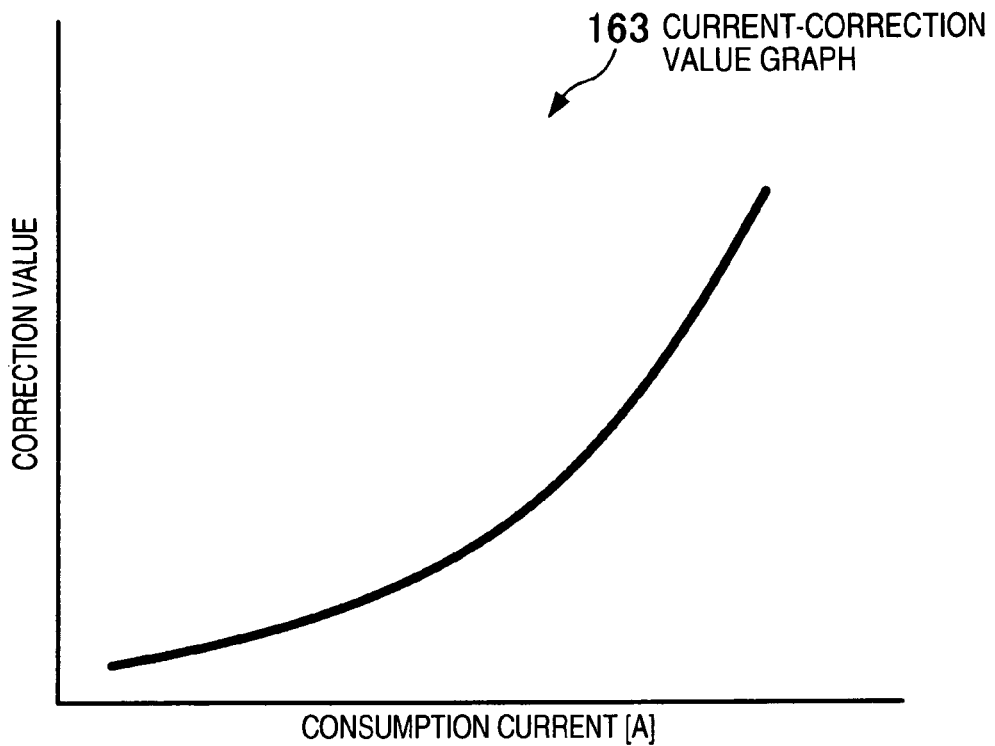
FIG. 26 is a diagram showing a relationship between a consumption current of an electric component and a correction value of a voltage according to the second embodiment.

As shown in FIG. 26, a current-correction value graph 163 shows that the correction value to correct the voltage calculated by the power generation amount calculating section 130 is set to correspond to the consumption current of the electric component installed in the vehicle.

This correction value is set to be high when the consumption current of the electric component is large and to be low when the consumption current of the electric component is small. This is based on the requirement that the alternator 300 has to output higher power since power generated by the alternator 300 is consumed in bulk in the electric component when the consumption current is large.

Returning to FIG. 21 again, process functions of the master ECU 100 will be further described.

Upon receiving an instruction to correct the voltage calculated by the power generation amount calculating section 130 from the charging rate acquiring section 150, the correction processing section 170 acquires vehicle condition information related to the vehicle conditions from the vehicle condition detecting section 110. In addition, the correction processing section 170 uses the acquired vehicle condition information to acquire the correction value of the voltage from the correction value storing section 160. Further, the correction processing section 170 uses the acquired correction value to correct the voltage calculated by the power generation amount calculating section 130, and instructs the alternator 300 to output the corrected voltage.

When the corrected voltage is output from the alternator 300 and the battery 200 is charged, the correction processing section 170 monitors the voltage of the battery 200 for a predetermined period of time to determine whether or not the voltage increases. If it is determined that the voltage does not increase for the predetermined period of time, the correction processing section 170 corrects the voltage again and instructs the alternator 300 to output a higher voltage.

If it is determined that the alternator 300 has insufficient capability to supply the power to electric components, the feed of the power to the electric components is restricted depending on the battery charging rate and remaining fuel. In this case, the feed of power to an electric component having no direct relation to running of the vehicle is preferentially restricted.

For example, when the external environment detecting section 114 detects brightness in the outside of the vehicle through an optical sensor, if a light of the vehicle is turned on although it is determined that it is bright in the outside of the vehicle, the light is turned off. In addition, if an air conditioner is turned on although temperature in the outside of the vehicle is low, the air conditioner is turned off.

If the voltage calculated by the power generation amount calculating section need not be urgently corrected, it may be intermittently corrected. For example, if the amount of remaining fuel is less than a predetermined value or if the battery charging rate is less than a predetermined value, it may be intermittently corrected.

Interruption time of the correction process and execution time of the intermittent correction process when the correction processing section 170 performs the intermittent correction process, and a time taken from the voltage correction process to determination on whether or not the correction process is performed again are stored in the predetermined time storing section 180.

Hereinafter, a relationship between the vehicle condition information and each of the times which is stored in the predetermined time storing section 180, will be described using a graph.

Figure 27:
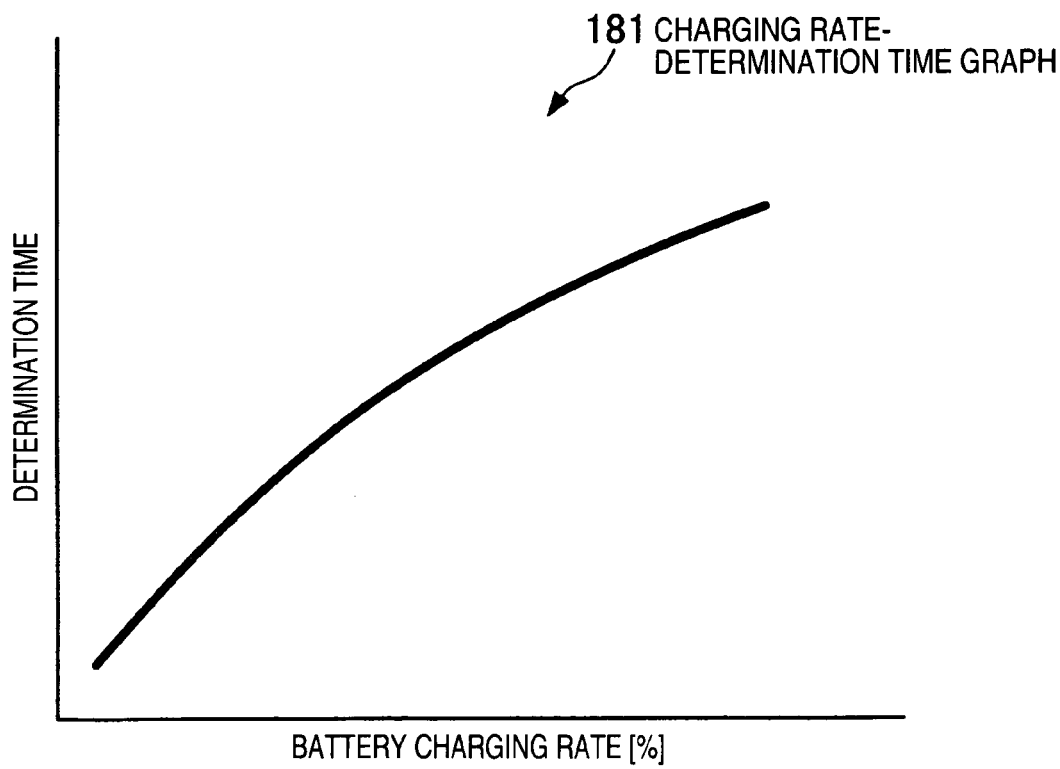
FIG. 27 is a diagram showing a relationship between a battery charging rate and a time to determine whether or not a correction process is performed again according to the second embodiment.

As shown in FIG. 27, a charging rate-determination time graph 181 shows that a determination time to determine whether or not the voltage correction process is performed again is set to correspond to the battery charging rate.

The determination time is set to be long when the battery charging rate is high and short when the battery charging rate is low. This is based on the requirement that the battery charging rate has to increase faster as the battery charging rate is lower since a danger of rising of a battery voltage increases as the battery charging rate is lower.

Figure 28:
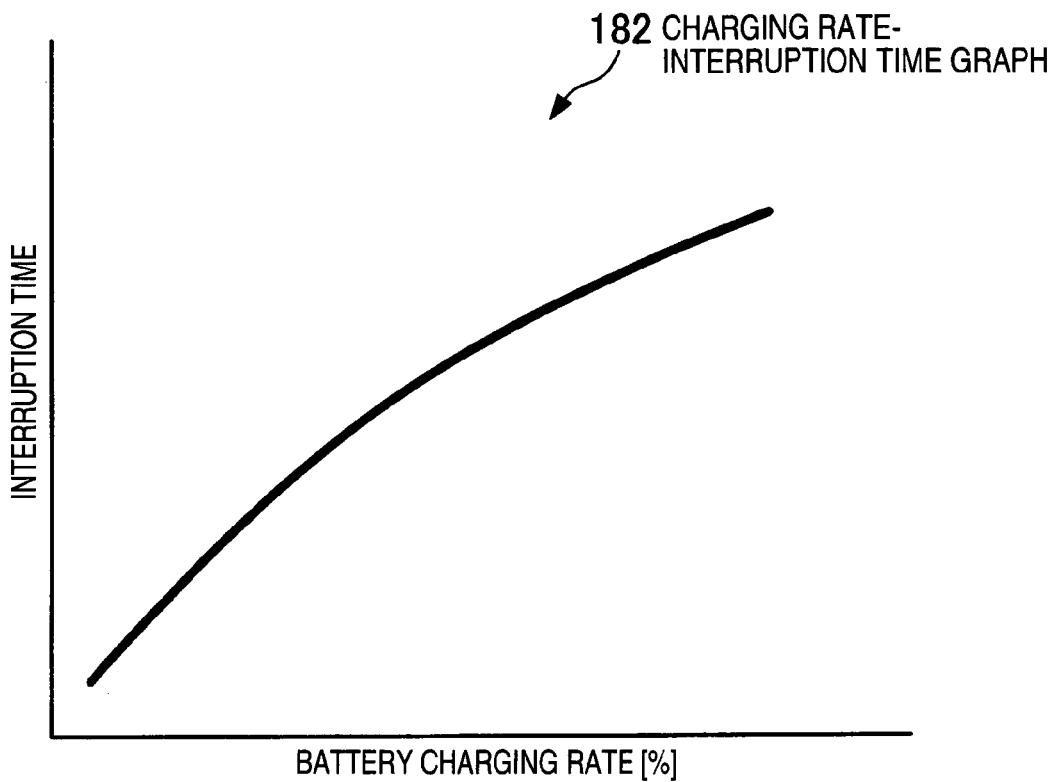
FIG. 28 is a diagram showing a relationship between a battery charging rate and a time to interrupt a voltage correction process according to the second embodiment.

As shown in FIG. 28, a charging rate-interruption time graph 182 shows that an interruption time of the intermittent voltage correction process is set to correspond to the battery charging rate.

The interruption time is set to be long when the battery charging rate is high and short when the battery charging rate is low. This is based on the requirement that the battery charging rate has to increase faster as the battery charging rate is lower since a danger of rising of a battery voltage increases as the battery charging rate is lower.

Figure 29:
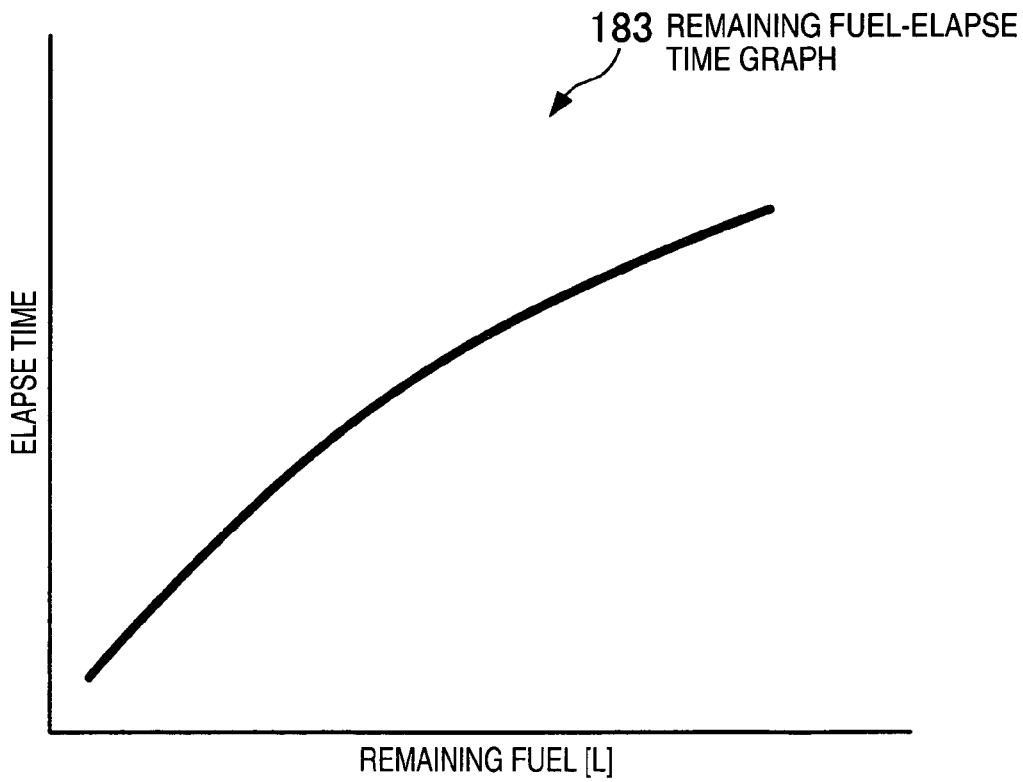
FIG. 29 is a diagram showing a relationship between remaining fuel and a time to stop a voltage correction process according to the second embodiment.

As shown in FIG. 29, a remaining fuel-elapse time graph 183 shows that a time elapsed from initiation of the intermittent voltage correction process is set to correspond to the remaining fuel. The intermittent voltage correction process is stopped when a predetermined elapse time passes.

The elapse time is set to be long when the amount of remaining fuel is large and short when the amount of remaining fuel is small. This is based on the requirement that the time taken to perform the voltage correction process that consumes fuel has to be set to be shorter as the amount of remaining fuel is smaller since a danger of lack of gas increases as the amount of remaining fuel is smaller. On the other hand, as the amount of remaining fuel is larger, the time taken to perform the voltage correction process is set to be longer.

Next, examples of various kinds of data stored in the master ECU 100 will be described.

A charging rate-correction value table 164, as shown in FIG. 30, is stored in the correction value storing section 160 and shows battery charging rates and corresponding correction values, with a pair of a battery charging rate and a corresponding correction value forming a record.

The battery charging rates of the battery 200 are set to decrease by 5% from 75% to 55%. The correction values are set as voltage values to be added to the voltage calculated by the power generation amount calculating section 130 when the voltage correction process is performed.

As shown in the charging rate-correction value graph 161 of FIG. 24, the correction value is set to be large as the battery charging rate is lowered. In addition, setting the battery charging rate to start from 75% is based on the requirement that the voltage correction process should not be performed when the battery charging rate exceeds 75%.

A vehicle condition-correction value table 165, as shown in FIG. 31, is stored in the correction value storing section 160. The vehicle condition-correction value table 165 shows vehicle conditions and corresponding correction values, with a pair of a vehicle condition and a corresponding correction value forming a record.

The vehicle conditions are set to be acceleration, idle, constant speed, and deceleration-racing. The correction values are set to be X1, X2, X3 and X4.

In this example, the set correction values have a relationship of X1<X2<X3<X4. This relationship is set since, if the voltage calculated by the power generation amount calculating section 130 is corrected to be high in acceleration of the vehicle, torque, which is generated in an engine of the vehicle and has to be used for acceleration of the vehicle, is much used to generate power in the alternator 300, which results in deterioration of driving efficiency.

In deceleration or racing of the vehicle, contrary to the acceleration, the driving efficiency is not affected since there is no need for torque to accelerate the vehicle even if the voltage calculated by the power generation amount calculating section 130 is corrected to be high, and the torque generated in the engine of the vehicle is used to generate power in the alternator 300. Accordingly, the correction values are set to be small in the acceleration and large in the deceleration-racing.

The master ECU 100 having the above-described functions and data performs the following processes.

Hereinafter, the flow chart of FIG. 32 will be described with step numbers.

[Step S211] The battery condition detecting section 111 detects a voltage, current and liquid temperature of the battery. The electric component using status detecting section 112 detects using status of electric components installed in a vehicle. Specifically, the amount of current consumed by the electric components is detected.

The vehicle situation detecting section 113 detects vehicle conditions including acceleration, idle, constant speed, deceleration, and racing. The external environment detecting section 114 detects information on traffic congestion on a path to a destination set in the navigator 500 and information on atmospheric temperature. The remaining fuel detecting section 115 detects the amount of remaining fuel of the vehicle.

[Step S212] The power generation amount calculating section 130 acquires a target voltage of the battery 200 from the target voltage storing section 120 and a voltage of the battery 200 from the battery condition detecting section 111, and, based on a difference between both acquired voltages, calculates a voltage to be generated by the alternator 300.

[Step S213] The charging rate acquiring section 150 acquires the voltage and current of the battery 200 from the battery condition detecting section 111 and calculates an internal resistance of the battery 200 based on the acquired voltage and current. In addition, the charging rate acquiring section 150 calculates an open voltage of the battery 200 based on the voltage, current and internal resistance of the battery 200 and acquires a battery charging rate using the calculated open voltage. In addition, the charging rate acquiring section 150 determines whether or not the voltage calculated by the power generation amount calculating section 130 is to be corrected from the acquired battery charging rate.

For example, if a threshold value is pre-set to be 75% of the battery charging rate, the charging rate acquiring section 150 determines whether or not the voltage calculated by the power generation amount calculating section 130 is to be corrected depending on whether or not the acquired battery charging rate exceeds the threshold value. If it is determined that the voltage is to be corrected, the process proceeds to Step S214. Otherwise, the process returns.

[Step S214] The correction processing section 170 acquires information on the remaining fuel of the vehicle from the remaining fuel detecting section 115 and information on a distance to the destination set in the navigator 500 and traffic congestion on the path to the destination from the external environment detecting section 114. Based on the information on the distance to the destination and the traffic congestion on the path to the destination, the correction processing section 170 calculates the minimal amount of fuel required to arrive at the destination.

For example, assuming that fuel efficiency of the vehicle is 10 km/L, a distance to the destination set in the navigator 500 is 50 km, and a 2 km interval is in traffic congestion, the minimal amount of fuel required to arrive at the destination can be calculated to be (5+offset value)L according to the following equation (2).

(Distance to destination/fuel efficiency)+offset of excessive fuel consumption in traffic congestion=minimal amount of fuel required to arrive at destination (2)

Here, when the offset of excessive fuel consumption in traffic congestion is expressed by the following equation (3), the minimal amount of fuel required to arrive at destination is calculated to be 7 L.

Traffic congestion distance×1=offset of excessive fuel consumption in traffic congestion (3)

The correction processing section 170 takes the calculated minimal amount of fuel required to arrive at destination as a threshold value A and determines whether or not the amount of remaining fuel of the vehicle exceeds the threshold value A. If it is determined that the amount of remaining fuel of the vehicle does not exceed the threshold value A, the process proceeds to Step S225 to intermittently perform the voltage correction process that relatively much consumes fuel. If it is determined that the amount of remaining fuel of the vehicle exceeds the threshold value A, the process proceeds to Step S215.

[Step S215] The correction processing section 170 acquires the battery charging rate from the charging acquiring part 150 and determines whether or not the battery charging rate is less than a predetermined threshold value B. If it is determined that the battery charging rate is more than the threshold value B, the process proceeds to Step S225 to intermittently perform the voltage correction process although there is a need to fully perform the voltage correction process since the battery charging rate is less than 75% as determined in Step S213. If it is determined that the battery charging rate is less than the threshold value B, it is determined that the voltage correction process has to be fully performed, and thus, the process proceeds to Step S225.

[Step S216] The correction processing section 170 acquires the vehicle condition information from the vehicle condition detecting section 110. In addition, based on the acquired vehicle condition information, the correction processing section 170 acquires the correction value to correct the voltage calculated by the power generation amount calculating section 130 from the correction value storing section 160.

When the correction value to correct the voltage is in correspondence to the battery charging rate, the liquid temperature, the using status of the electric components, for example, the amount of current consumed by the electric components, and the vehicle conditions, the correction processing section 170 acquires the battery charging rate from the charging rate acquiring section 150, the liquid temperature from the battery condition detecting section 111, the amount of current consumed by the electric components from the electric component using status detecting section 112, and the vehicle conditions from the vehicle situation condition 113. In addition, based on the acquired vehicle condition information, the correction processing section 170 acquires the correction value from the correction value storing section 160 and corrects the voltage. The correction processing section 170 may correct the voltage using each or all of correction values corresponding to the vehicle conditions. If the correction processing section 170 corrects the voltage using all of the correction values, the correction processing section 170 calculates a correction value by multiplying the correction values corresponding to the vehicle together and corrects the voltage using the calculated correction value (hereinafter referred to as first voltage correction).

[Step S217] The correction processing section 170 instructs the alternator 300 to output a voltage after the first voltage correction.

[Step S218] The correction processing section 170 acquires the battery charging rate from the charging rate acquiring section 150 and acquires a determination time to determine whether or not the voltage correction process is again performed from the predetermined time storing section 180 using the acquired battery charging rate. In addition, the correction processing section 170 instructs the alternator 300 to output the voltage and determines whether or not the acquired determination time elapses. If it is determined that the acquired determination time elapses, the process proceeds to Step S219.

[Step S219] The correction processing section 170 acquires the voltage of the battery 200 from the battery condition detecting section 111, instructs the alternator 300 to output the voltage, as described in Step S217, and determines whether or not a voltage of the battery 200 charged by the voltage output from the alternator 300 increases. If it is determined that the voltage of the battery 200 does not increase, the process proceeds to Step S220. If it is determined that the voltage of the battery 200 increases, the process proceeds to Step S222.

[Step S220] The correction processing section 170 calculates a correction value to correct the voltage after the first voltage correction, which is calculated in Step S216, and corrects the voltage after the first voltage correction based on the calculated correction value (hereinafter referred to as second voltage correction). For example, a preset correction value is added to the voltage after the first voltage correction.

[Step S221] The correction processing section 170 instructs the alternator 300 to output a voltage after the second voltage correction, which is corrected again in Step S220.

[Step S222] The correction processing section 170 acquires the battery charging rate from the charging rate acquiring section 150 and determines whether or not the battery charging rate is less than a preset threshold value C. If it is determined that the battery charging rate is less than the threshold value C, the process proceeds to Step S223. If it is determined that the battery charging rate is more than the threshold value C, the process returns.

[Step S223] The correction processing section 170 acquires the amount of remaining fuel of the vehicle from the remaining fuel detecting section 115 and determines whether or not the amount of remaining fuel is less than a preset threshold value D. If it is determined that the amount of remaining fuel is less than the threshold value D, correction for the voltage of the battery 200 is abandoned since the battery charging rate is not recovered although the second correction process is performed in Step S221 and since the remaining fuel is insufficient, and process proceeds to Step S224. If it is determined that the amount of remaining fuel is more than the threshold value D, the process returns.

[Step S224] The correction processing section 170 limits feed of power to the electric components installed in the vehicle. That is, when the correction processing section 170 determines that the battery charging rate can not be recovered by further voltage correction when the battery charging rate does not increase although the second voltage correction is performed and when the remaining fuel is insufficient, the correction processing section 170 attempts to recover the battery charging rate by limiting the feed of power to the electric components that are installed in the vehicle and consume power. At this time, the feed of power to the electric components is limited depending on external environments. Particularly, feed of power to electric components that are not necessary for driving of the vehicle is preferentially limited.

[Step S225] The correction processing section 170 acquires interruption time of the intermittent voltage correction process. Specifically, the correction processing section 170 acquires the battery charging rate from the charging rate acquiring section 150 and acquires the interruption time stored in the predetermined time storing section 180 based on the acquired battery charging rate.

[Step S226] The correction processing section 170 stops the voltage correction process. If the voltage correction process is not performed when Step S226 comes around, the state that the voltage correction process is not performed remains as it is.

[Step S227] The correction processing section 170 determines whether or not the interruption time acquired in Step S225 elapses after the stop of the voltage correction process in Step S226. If it is determined that the interruption time elapses, the process proceeds to Step S228.

[Step S228] The correction processing section 170 releases the stop of the voltage correction process.

[Step S229] The correction processing section 170 performs the voltage correction process. Specifically, the correction processing section 170 performs the processes from Step S216 to Step S221.

[Step S230] The correction processing section 170 determines whether or not a predetermined time elapses after performing the voltage correction process. Specifically, the correction processing section 170 acquires the amount of remaining fuel from the remaining fuel detecting section 115, and, based on the acquired amount of remaining fuel, acquires the predetermined time stored in the predetermined time storing section 180. When the correction processing section 170 determines that the predetermined time elapses after performing the voltage correction process, the process proceeds to Step S231.

[Step S231] The correction processing section 170 stops the voltage correction process.

By performing the above-described processes, the voltage to be output from the alternator 300 is corrected depending on the vehicle conditions so that the battery 200 can be early charged.

In addition, although the power generation amount calculating section 130 calculates the voltage to be generated by the alternator 300 in the second embodiment, the power generation amount calculation part 130 may calculate current or work to be output from the alternator 300. In this case, a correction value to correct the current or work may be stored in the correction value storing section 160.

In addition, although the voltage correction process is performed when the battery charging rate is less than the threshold value of 75% in the second embodiment, the threshold value may be varied depending on properties of vehicles or properties of running paths of vehicles, without being limited to 75%.

In addition, although the charging control apparatus 1 is provided independently in the second embodiment, it may be built in the alternator and operated as a battery charging apparatus.

[FIG. 1]
10: CHARGING CONTROL APPARATUS
21: CAR NAVIGATOR
22: RADIO
15: VOLTAGE SENSOR
11: BATTERY
16: CURRENT SENSOR
17: TEMPERATURE SENSOR
19: VOLTAGE SENSOR
12: ALTERNATOR
20: CURRENT SENSOR
13: ELECTRIC COMPONENT

[FIG. 2]
10: CHARGING CONTROL APPARATUS
300: MICROCOMPUTER

[FIG. 3]
10: CHARGING CONTROL APPARATUS
41: BATTERY CONDITION DETECTING SECTION
42: ALTERNATOR CONDITION DETECTING SECTION
43: ELECTRIC COMPONENT USING STATUS DETECTING SECTION
44: VEHICLE RUNNING CONDITION DETECTING SECTION
45: ELECTRIC COMPONENT USING STATUS PREDICTING SECTION
46: VEHICLE RUNNING CONDITION PREDICTING SECTION
47: GRADUAL CHANGE REQUIREMENT DETERMINING SECTION
48: GRADUAL CHANGE RATE DECIDING SECTION
49: SUDDEN CHANGE PERFORMING SECTION
50: GRADUAL CHANGE PERFORMING SECTION

[FIG. 4]
GRADUAL CHANGE REQUIREMENT DETERMINATION PROCESS
S11: GRADUAL CHANGE REQUIREMENT DETERMINATION PROCESS AT FORMER STAGE
S12: GRADUAL CHANGE PROCESS REQUIRED?
S13: GRADUAL CHANGE REQUIREMENT DETERMINATION PROCESS AT LATTER STAGE
S14: GRADUAL CHANGE PROCESS REQUIRED?
S15: GRADUAL CHANGE PERFORMANCE PROCESS
S16: SUDDEN CHANGE PERFORMANCE PROCESS RETURN

[FIG. 5]
FIRST FORMER GRADUAL CHANGE REQUIREMENT DETERMINATION PROCESS
S21: IS ELECTRIC COMPONENT USED?
S22: GRADUAL CHANGE PROCESS REQUIRED
S23: GRADUAL CHANGE PROCESS NOT REQUIRED. RETURN

[FIG. 6]
SECOND FORMER GRADUAL CHANGE REQUIREMENT DETERMINATION PROCESS
S31: ACQUIRE POSITION OF VEHICLE.
S32: ACQUIRE WEATHER INFORMATION.
S33: ACQUIRE TIME INFORMATION.
S34: PREDICT ELECTRIC COMPONENT TO BE USED.
S35: WILL ELECTRIC COMPONENT BE USED?
S36: GRADUAL CHANGE PROCESS REQUIRED.
S37: GRADUAL CHANGE PROCESS NOT REQUIRED. RETURN

[FIG. 7]
FIRST LATTER GRADUAL CHANGE REQUIREMENT DETERMINATION PROCESS
S41: ACQUIRE VOLTAGE OR CHARGING RATE OF BATTERY.
S42: VEHICLE RUNNING CONDITION CHANGED?
S43: ACQUIRE GENERATING VOLTAGE Va1.
S44: ACQUIRE TARGET GENERATING VOLTAGE Va2.
S45: VOLTAGE OR CHARGING RATE OF BATTERY≧PREDETERMINED VALUE?
S46: DECELERATION?
S47: GRADUAL CHANGE PROCESS NOT REQUIRED.
S48: |Va2-Va1|≧ PREDETERMINED VALUE?
S49: GRADUAL CHANGE PROCESS REQUIRED. RETURN

[FIG. 8]
BATTERY CHARGING RATE (%)
BATTERY VOLTAGE Vb (V)

[FIG. 9]
CORRECTION COEFFICIENT
LIQUID TEMPERATURE Tb (° C.)

[FIG. 10]
SECOND LATTER GRADUAL CHANGE REQUIREMENT DETERMINATION PROCESS
S51: ACQUIRE VOLTAGE OR CHARGING RATE OF BATTERY.
S52: VEHICLE RUNNING CONDITION CHANGED?
S53: ACQUIRE PRESENT POWER Pa1.
S54: ACQUIRE TARGET POWER Pa2.
S55: VOLTAGE OR CHARGING RATE OF BATTERY ≧ PREDETERMINED VALUE?
S56: DECELERATION?
S57: GRADUAL CHANGE PROCESS NOT REQUIRED.
S58: |Pa2-Pa1|≧ PREDETERMINED VALUE?
S59: GRADUAL CHANGE PROCESS REQUIRED. RETURN

[FIG. 11]
THIRD LATTER GRADUAL CHANGE REQUIREMENT DETERMINATION PROCESS
S61: ACQUIRE VOLTAGE OR CHARGING RATE OF BATTERY.

S62: ACQUIRE INFORMATION ON POSITION OF VEHICLE.
S63: PREDICT VEHICLE RUNNING CONDITION.
S64: VEHICLE RUNNING CONDITION CHANGED.
S65: ACQUIRE GENERATING VOLTAGE Va1.
S66: ACQUIRE TARGET GENERATING VOLTAGE Va2.
S67: VOLTAGE OR CHARGING RATE OF BATTERY ≧PREDETERMINED VALUE?
S68: DECELERATION?
S69: GRADUAL CHANGE PROCESS NOT REQUIRED.
S70: |Va2-Va1|≧ PREDETERMINED VALUE?
S71: GRADUAL CHANGE PROCESS REQUIRED. RETURN

[FIG. 12]

FOURTH LATTER GRADUAL CHANGE REQUIREMENT DETERMINATION PROCESS
S81: ACQUIRE VOLTAGE OR CHARGING RATE OF BATTERY.
S82: ACQUIRE INFORMATION ON POSITION OF VEHICLE,
S83: PREDICT VEHICLE RUNNING CONDITION.
S84: VEHICLE RUNNING CONDITION CHANGED.
S85: ACQUIRE PRESENT POWER Pa1.
S86: ACQUIRE TARGET POWER Pa2.
S87: VOLTAGE OR CHARGING RATE OF BATTERY ≧ PREDETERMINED VALUE?
S88: DECELERATION?
S89: GRADUAL CHANGE PROCESS NOT REQUIRED.
S90: |Pa2-Pa1|≧ PREDETERMINED VALUE?
S71: GRADUAL CHANGE PROCESS REQUIRED. RETURN

[FIG. 13]

GRADUAL CHANGE RATE DECISION PROCESS
S101: ACQUIRE VOLTAGE OR CHARGING RATE OF BATTERY.
S102: ACQUIRE INFORMATION ON VEHICLE RUNNING CONDITION.
S103: VOLTAGE OR CHARGING RATE OF BATTERY ≧ PREDETERMINED VALUE?
S104: SELECT FIRST GRADUAL CHANGE RATE TABLE.
S105: DECIDE GRADUAL CHANGE RATE.
S106: SELECT SECOND GRADUAL CHANGE RATE TABLE.
S107: DECIDE GRADUAL CHANGE RATE.

[FIG. 14]

VEHICLE RUNNING CONDITION BEFORE BEING CHANGED

VEHICLE RUNNING CONDITION AFTER BEING CHANGED

GRADUAL CHANGE RATE
  POWER BEING CUT
  POWER NOT BEING CUT
DECELERATION
IDLE
CONSTANT RATE
ACCELERATION

[FIG. 15]

VEHICLE RUNNING CONDITION BEFORE BEING CHANGED

VEHICLE RUNNING CONDITION AFTER BEING CHANGED

GRADUAL CHANGE RATE
DECELERATION
IDLE
CONSTANT RATE
ACCELERATION

[FIG. 16]

SUDDEN CHANGE PROCESS
S121: ACQUIRE TARGET GENERATING VOLTAGE Va2.
S122: PERFORM SUDDEN CHANGE PROCESS.
RETURN

[FIG. 17]

GRADUAL CHANGE PROCESS
S111: ACQUIRE GRADUAL CHANGE RATE.
S121: ACQUIRE TARGET GENERATING VOLTAGE Va2.
S122: PERFORM GRADUAL CHANGE PROCESS.
RETURN

[FIG. 18]
1: CHARGING CONTROL APPARATUS
2: BATTERY
3: SENSOR
1a: VEHICLE CONDITION DETECTING SECTION
1b: TARGET ELECTRIC QUANTITY DETERMINING SECTION
1d: CORRECTION VALUE ACQUIRING SECTION
1e: TARGET ELECTRIC QUANTITY CORRECTING SECTION
1c: CORRECTION VALUE STORING SECTION
4: ELECTRIC GENERATOR

[FIG. 19]
100: MASTER ECLT
500: NAVIGATOR
410: COMMUNICATION BUS
410: POWER LINE

[FIG. 20]
400: BUS
100: MASTER ECU
101: MECRO COMPUTER

[FIG. 21]
100: MASTER ECU
110: VEHICLE CONDITION DETECTING SECTION
111: BATTERY CONDITION DETECTING SECTION
112: ELECTRIC COMPONENT USING STATUS DETECTING SECTION
113: VEHICLE SITUATION DETECTING SECTION
114: EXTERNAL ENVIRONMENT DETECTING SECTION
115: REMAINING FUEL DETECTING SECTION
130: POWER GENERATION AMOUNT CALCULATING SECTION
140: CHARGING RATE STORING SECTION
150: CHARGING RATE ACQUIRING SECTION
170: CORRECTION PROCESSING SECTION
120: TARGET VOLTAGE STORING SECTION
180: PREDETERMINED TIME STORING SECTION

160: CORRECTION VALUE STORING SECTION

[FIG. 22]
141: VOLTAGE-CHARGING RATE GRAPH
BATTERY CHARGING RATE [%]
OPEN VOLTAGE [v]

[FIG. 23]
142: LIQUID TEMPERATURE-CORRECTION VALUE GRAPH
CORRECTION VALUE
LIQUID TEMPERATURE [° C.]

[FIG. 24]
161: CHARGING RATE -CORRECTION VALUE GRAPH
CORRECTION VALUE
BATTERY CHARGING RATE [%]

[FIG. 25]
162: LIQUID TEMPERATURE-CORRECTION VALUE GRAPH
CORRECTION VALUE
LIQUID TEMPERATURE [° C.]

[FIG. 26]
163: CURRENT-CORRECTION VALUE GRAPH
CORRECTION VALUE
CONSUMPTION CURRENT [A]

[FIG. 27]
181: CHARGING RATE-DETERMINATION TIME GRAPH
DETERMINATION TIME
BATTERY CHARGING RATE [%]

[FIG. 28]
182: CHARGING RATE-INTERRUPTION TIME GRAPH
INTERRUPTION TIME
BATTERY CHARGING RATE [%]

[FIG. 29]
183: REMAINING FUEL-ELAPSE TIME GRAPH
ELAPSE TIME
REMAINING FUEL [L]

[FIG. 30]
164: CHARGING BATE-CORRECTION TABLE
BATTERY CHARGING RATE [%]
CORRECTION VALUE

[FIG. 31]
165: VEHICLE SITUATION-CORRECTION TABLE
VEHICLE SITUATION
    ACCELERATION
    IDLE
    CONSTANT RATE
    DECELERATION OR RACING
CORRECTION VALUE [V]

Figure 32:
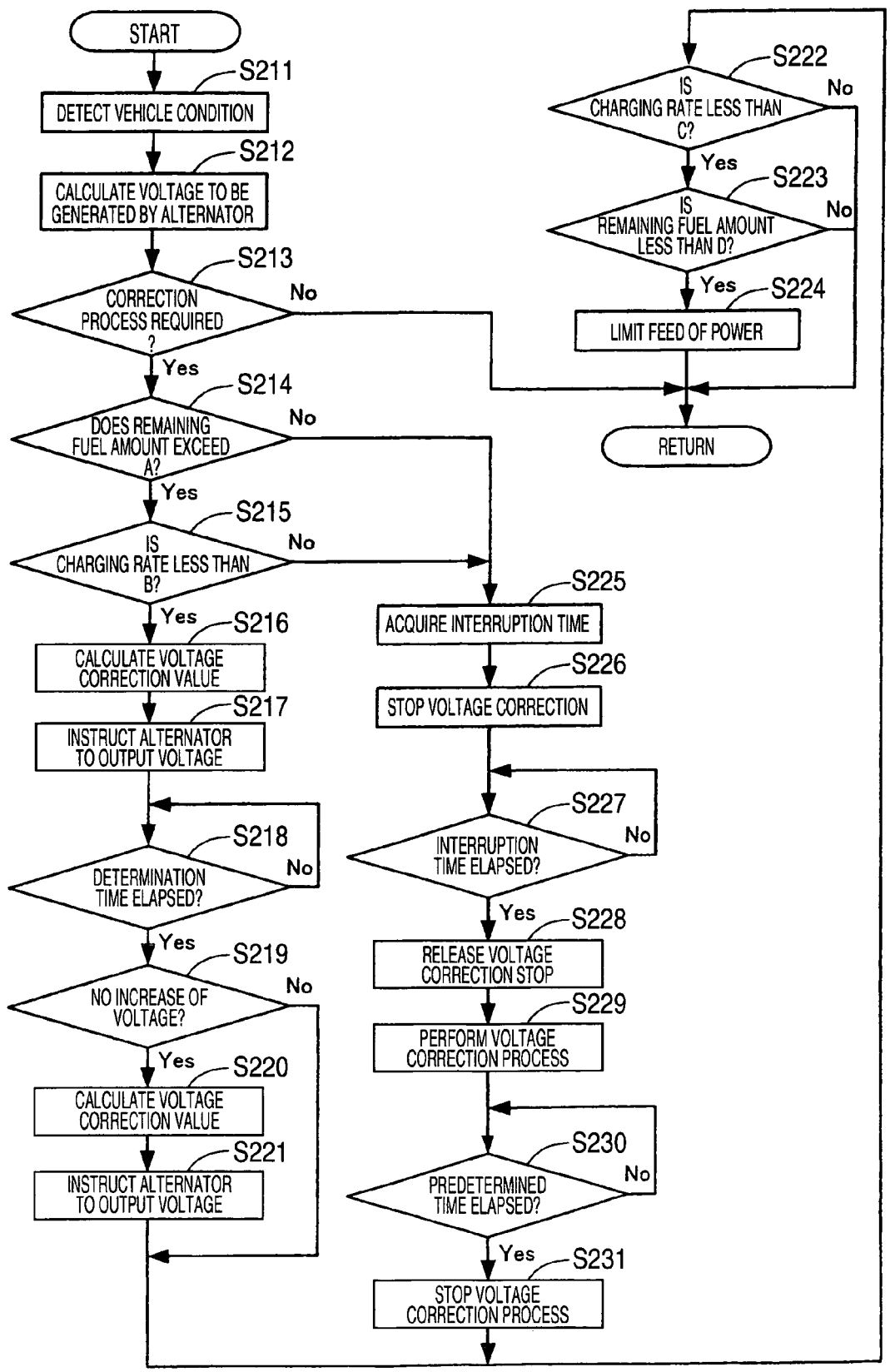
FIG. 32 is a flow chart showing a process of battery charging control according to the second embodiment.

[FIG. 32]
START
S211: DETECT VEHICLE CONDITION.
S212: CALCULATE VOLTAGE TO BE GENERATED BY ALTERNATOR.
S213: CORRECTION PROCESS REQUIRED?
S214: DOES REMAINING FUEL AMOUNT EXCEED A?
S215: IS CHARGING RATE LESS THAN B?
S216: INSTRUCT ALTERNATOR TO OUTPUT VOLTAGE.
S218: DETERMINATION TIME ELAPSED?
S219: NO INCREASE OF VOLTAGE?
S220: CALCULATE VOLTAGE CORRECTION VALUE.
S221: INSTRUCT ALTERNATOR TO OUTPUT VOLTAGE.
S225: ACQUIRE INTERRUPTION TIME.
S226: STOP VOLTAGE CORRECTION.
S227: INTERRUPTION TIME ELAPSED?
S228: RELEASE VOLTAGE CORRECTION STOP
S229: PERFORM VOLTAGE CORRECTION PROCESS.
S230: PREDETERMINED TIME ELAPSED?
S231: STOP VOLTAGE CORRECTION PROCESS.
S222: Is CHARGING RATE LESS THAN C?
S223: IS REMAINING FUEL AMOUNT LESS THAN D?
S224: LIMET FEED OF POWER.
RETURN

What is claimed is:

1. A charging control apparatus adapted to control an alternator which is operable to generate a voltage to charge a battery which is operable to supply the voltage to an electric component, the charging control apparatus comprising:
an interface, connected to the alternator, the battery, and the electric component and operable to input and output a signal therebetween; and
a microcomputer, connected to the interface and operable to execute a gradual change process in which a generating voltage of the alternator is gradually changed to a target generating voltage of the alternator and a sudden change process in which the generating voltage is suddenly changed to the target generating voltage, wherein:
the microcomputer is operable to detect a using status of the electric component based on the signal;
the microcomputer is operable to judge whether the gradual change process is required or the sudden change process is required based on the detected using status;
the microcomputer executes the sudden change process when the microcomputer judges that the sudden change process is required;
the microcomputer executes the gradual change process when the microcomputer judges that the gradual change process is required;
the microcomputer is operable to predict the using status based on an external information; and
the microcomputer is operable to judge whether the gradual change process is required or the sudden change process is required based on the predicted using status.

2. A charging control apparatus adapted to control an alternator which is operable to generate a voltage to charge a battery which is operable to supply the voltage to an electric component, the charging control apparatus comprising:
an interface, connected to the alternator, the battery, and the electric component and operable to input and output a signal therebetween; and
a microcomputer, connected to the interface and operable to execute a gradual change process in which a generating voltage of the alternator is gradually changed to a target generating voltage of the alternator and a sudden change process in which the generating voltage is suddenly changed to the target generating voltage, wherein:
the microcomputer is operable to detect a using status of the electric component based on the signal;
the microcomputer is operable to judge whether the gradual change process is required or the sudden change process is required based on the detected using status;

the microcomputer executes the sudden change process when the microcomputer judges that the sudden change process is required;

the microcomputer executes the gradual change process when the microcomputer judges that the gradual change process is required;

the microcomputer is operable to detect a running condition of a vehicle; and the microcomputer judges whether the gradual change process is required or the sudden change process is required when the running condition is changed.

3. A charging control apparatus adapted to control an alternator which is operable to generate a voltage to charge a battery which is operable to supply the voltage to an electric component, the charging control apparatus comprising:

an interface, connected to the alternator, the battery, and the electric component and operable to input and output a signal therebetween; and a microcomputer, connected to the interface and operable to execute a gradual change process in which a generating voltage of the alternator is gradually changed to a target generating voltage of the alternator and a sudden change process in which the generating voltage is suddenly changed to the target generating voltage, wherein:

the microcomputer is operable to detect a using status of the electric component based on the signal;

the microcomputer is operable to judge whether the gradual change process is required or the sudden change process is required based on the detected using status;

the microcomputer executes the sudden change process when the microcomputer judges that the sudden change process is required;

the microcomputer executes the gradual change process when the microcomputer judges that the gradual change process is required;

the charging control apparatus is mounted on a vehicle;

the microcomputer is operable to predict a running condition of the vehicle based on an external information; and the microcomputer is operable to judge whether the gradual change process is required or the sudden change process is required when the running condition is changed.

4. The charging control apparatus as set forth in claim 1, wherein:

the using status of the electric component is recognizable by a user.

* * * * *